US011268052B2

(12) United States Patent
Labeque et al.

(10) Patent No.: US 11,268,052 B2
(45) Date of Patent: Mar. 8, 2022

(54) CONTAINER SYSTEMS WITH WATER-SOLUBLE POUCHES COMPRISING A PVOH RESIN BLEND

(71) Applicant: The Procter & Gamble Company, Cincinnati, OH (US)

(72) Inventors: Regine Labeque, Neder-Over-Heembeek (BE); Florence Catherine Courchay, Brussels (BE); Robby Renilde Francois Keuleers, Lippelo (BE); Karel Jozef Maria Depoot, Anzegem-Vichte (BE); Hugo Robert Germain Denutte, Hofstade (BE); Steven George Friedrich, Crown Point, IN (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/486,669

(22) Filed: Apr. 13, 2017

(65) Prior Publication Data
US 2017/0298308 A1 Oct. 19, 2017

Related U.S. Application Data

(60) Provisional application No. 62/321,962, filed on Apr. 13, 2016.

(51) Int. Cl.
| C11D 3/50 | (2006.01) |
| C11D 17/04 | (2006.01) |
| B65D 77/06 | (2006.01) |
| B65D 1/22 | (2006.01) |
| B65D 33/25 | (2006.01) |
| B65D 43/02 | (2006.01) |
| B65D 43/16 | (2006.01) |
| B65D 43/22 | (2006.01) |
| B65D 65/02 | (2006.01) |
| B65D 65/46 | (2006.01) |
| B65D 75/30 | (2006.01) |
| B65D 77/02 | (2006.01) |
| B65D 77/22 | (2006.01) |
| B65D 85/804 | (2006.01) |
| C08J 5/18 | (2006.01) |
| C11D 3/37 | (2006.01) |
| C11D 3/43 | (2006.01) |
| C11D 3/20 | (2006.01) |

(52) U.S. Cl.
CPC .............. *C11D 17/042* (2013.01); *B65D 1/22* (2013.01); *B65D 33/2591* (2013.01); *B65D 43/0225* (2013.01); *B65D 43/16* (2013.01); *B65D 43/22* (2013.01); *B65D 65/02* (2013.01); *B65D 65/46* (2013.01); *B65D 75/30* (2013.01); *B65D 77/02* (2013.01); *B65D 77/06* (2013.01); *B65D 77/22* (2013.01); *B65D 85/804* (2013.01); *C08J 5/18* (2013.01); *C11D 3/3753* (2013.01); *C11D 3/43* (2013.01); *C11D 3/50* (2013.01); *C11D 3/505* (2013.01); *C11D 17/041* (2013.01); B65D 2543/00296 (2013.01); B65D 2543/00537 (2013.01); C08J 2329/04 (2013.01); C08J 2429/04 (2013.01); C11D 3/2041 (2013.01); C11D 17/045 (2013.01)

(58) Field of Classification Search
CPC ....... C11D 3/2041; C11D 3/3753; C11D 3/50; C11D 7/50; C11D 7/5077; C11D 9/44; C11D 11/0017; C11D 17/042; C11D 17/043
See application file for complete search history.

(56) References Cited

U.S. PATENT DOCUMENTS

| 1,029,446 | A | 6/1912 | Hunt | |
| 5,362,532 | A | 11/1994 | Famili et al. | |
| 6,787,512 | B1 * | 9/2004 | Verrall | C11D 17/043 428/35.2 |
| 7,067,575 | B2 | 6/2006 | Kitamura | |
| 7,642,226 | B2 | 1/2010 | Verrall | |
| 7,749,952 | B2 * | 7/2010 | Zhang | C11D 1/667 510/101 |
| 8,980,817 | B2 | 3/2015 | Wiedemann | |
| 9,133,329 | B2 | 9/2015 | Denome | |
| 9,267,098 | B2 * | 2/2016 | Miracle | C09B 29/0059 |
| 9,457,944 | B2 | 10/2016 | Meier | |
| 10,619,042 | B2 | 4/2020 | Labeque et al. | |
| 2009/0291282 | A1 | 11/2009 | Kitamura | |

(Continued)

FOREIGN PATENT DOCUMENTS

| JP | 04164998 A | 6/1992 |
| JP | 2014016929 A | 1/2014 |

(Continued)

OTHER PUBLICATIONS

PCT International Search Report for Application No. PCT/US2017/027414, dated Jul. 19, 2017, 15 pages.

(Continued)

Primary Examiner — Charles I Boyer
(74) Attorney, Agent, or Firm — Gregory S. Darley-Emerson

(57) ABSTRACT

A container system including a closeable container with at least one pouch in an interior space of the container, where the pouch includes a water-soluble film including a polyvinyl alcohol (PVOH) resin blend, and a perfume and organic solvent containing household care composition at least partially enclosed in a compartment by the water-soluble film.

21 Claims, 4 Drawing Sheets

(56) References Cited

U.S. PATENT DOCUMENTS

| | | |
|---|---|---|
| 2009/0312220 A1 | 12/2009 | Boutoille |
| 2010/0113318 A1 | 5/2010 | Wiedemann |
| 2011/0152163 A1 | 6/2011 | Labeque |
| 2014/0110301 A1 | 4/2014 | Carrier |
| 2014/0162929 A1 | 6/2014 | Labeque et al. |
| 2015/0080561 A1* | 3/2015 | Torres ............... C09B 29/0059 534/766 |
| 2015/0093526 A1 | 4/2015 | Denome et al. |
| 2015/0158646 A1 | 6/2015 | Meier |
| 2015/0184116 A1 | 7/2015 | Wiedemann |
| 2015/0275152 A1 | 10/2015 | Brooker |
| 2015/0336692 A1* | 11/2015 | Brandt Sanz ............ B65B 37/00 53/450 |
| 2016/0024446 A1 | 1/2016 | Lee et al. |
| 2016/0102278 A1 | 4/2016 | Labeque |
| 2016/0102279 A1 | 4/2016 | Labeque |
| 2017/0218146 A1 | 8/2017 | Childers |
| 2017/0226298 A1 | 8/2017 | Friedrich |
| 2017/0226338 A1 | 8/2017 | Friedrich |
| 2017/0233539 A1* | 8/2017 | Friedrich ............... C08J 5/18 510/296 |
| 2017/0259976 A1* | 9/2017 | Lee ........................ B65D 65/46 |
| 2017/0298216 A1 | 10/2017 | Labeque et al. |
| 2018/0127200 A1* | 5/2018 | Edwards ............... B65B 51/225 |
| 2020/0199344 A1 | 6/2020 | Labeque et al. |

FOREIGN PATENT DOCUMENTS

| | | |
|---|---|---|
| RU | 2099260 C1 | 12/1997 |
| RU | 2104643 C1 | 2/1998 |
| RU | 2572039 C2 | 12/2015 |
| WO | 2008087324 A2 | 7/2008 |
| WO | 2014151718 A2 | 9/2014 |
| WO | 2017180883 A1 | 10/2017 |
| WO | 2017180888 A1 | 10/2017 |

OTHER PUBLICATIONS

PCT International Search Report for application No. PCT/US2017/027409, dated Aug. 24, 2017, 14 pages.

U.S. Appl. No. 15/486,613, filed Apr. 13, 2017, Regine Labeque, et al.

All Office Actions, U.S. Appl. No. 15/486,613.

All Office Actions; U.S. Appl. No. 16/809,942, filed Mar. 5, 2020.

* cited by examiner

CONTAINER SYSTEMS WITH WATER-SOLUBLE POUCHES COMPRISING A PVOH RESIN BLEND

FIELD OF THE INVENTION

The present disclosure relates to container systems that include a closeable container and at least one pouch in an interior space of the container, where the pouch includes a water-soluble film including a polyvinyl alcohol (PVOH) resin blend, and household care composition containing perfume and organic solvent, where the composition is at least partially enclosed in a compartment by the water-soluble film.

BACKGROUND OF THE INVENTION

Water-soluble pouches have proven to be an effective and popular way to deliver unitized doses of household care compositions such as laundry detergents. Such pouches often package household care compositions in a compartment formed by a water-soluble film, thereby providing a convenient, no-mess form for the consumer. Consumers may select such products not only for convenience and performance benefits, but also for aesthetic reasons. For example, the products may deliver a pleasant scent to a target surface, such as a fabric.

When a consumer opens a closed container that includes such pouches, it is desirable for the consumer to perceive a pleasant bloom of the scent that is to be delivered. For example, the consumer may wish to sniff different varieties in the store to see which one she prefers to buy. Such a perfume bloom upon opening a container can also provide a pleasant distraction from the drudgery of household chores and make them more enjoyable.

However, the pouched form of these household care compositions makes the delivery of such a perfume bloom challenging. The pouches often include water-soluble films made from polyvinyl alcohol polymers, and such films are typically selected to minimize any leakage of ingredients, from inside the compartment(s) of the pouch. Leakage or loss of ingredients, such as organic solvents, may cause product stability problems, decreased performance benefits, under-filled pouches that may negatively impact consumer product quality perception, and/or pouches that stick together or that feel greasy to the consumer.

Films that are selected to minimize the leakage of the composition's ingredients will also generally result in low levels of perfume leakage. Low levels of perfume leakage means that the consumer may not experience the pleasant perfume bloom upon opening the container. This issue has been addressed in the past by applying a hot melt bead of perfume to the container as a scent substitute, but such an approach requires additional manufacturing or packaging steps, as well as additional chemistry to be developed and formulation cost.

There is a need to provide improved container systems that include at least one pouch, where a pleasant bloom of perfume is experienced upon opening the container, without additional manufacturing steps, chemistry, or formulation cost.

SUMMARY OF THE INVENTION

The present disclosure relates to container systems that include containers having pouches contained therein. The pouches include a household care composition, which includes perfume and organic solvent, at least partially enclosed in a compartment by water-soluble film.

The present disclosure relates to a container system that includes: a closeable container having walls that define an interior space, at least one pouch in the interior space, the pouch including a water-soluble film and a household care composition at least partially enclosed in a compartment by the water-soluble film, the household care composition including perfume and organic solvent, and the film including a polyvinyl alcohol (PVOH) resin blend, the PVOH resin blend including a first PVOH polymer that includes a first anionic monomeric unit, a vinyl alcohol monomer unit, and optionally a vinyl acetate unit, the PVOH resin blend further including a second PVOH polymer selected from a PVOH polymer that includes (a) a second anionic monomeric unit, a vinyl alcohol monomer unit and optionally a vinyl acetate unit, or (b) a PVOH homopolymer consisting of a vinyl alcohol monomer unit and optionally a vinyl acetate unit.

BRIEF DESCRIPTION OF THE DRAWINGS

The figures herein are illustrative in nature and are not intended to be limiting.

DETAILED DESCRIPTION OF THE INVENTION

Figure 1:
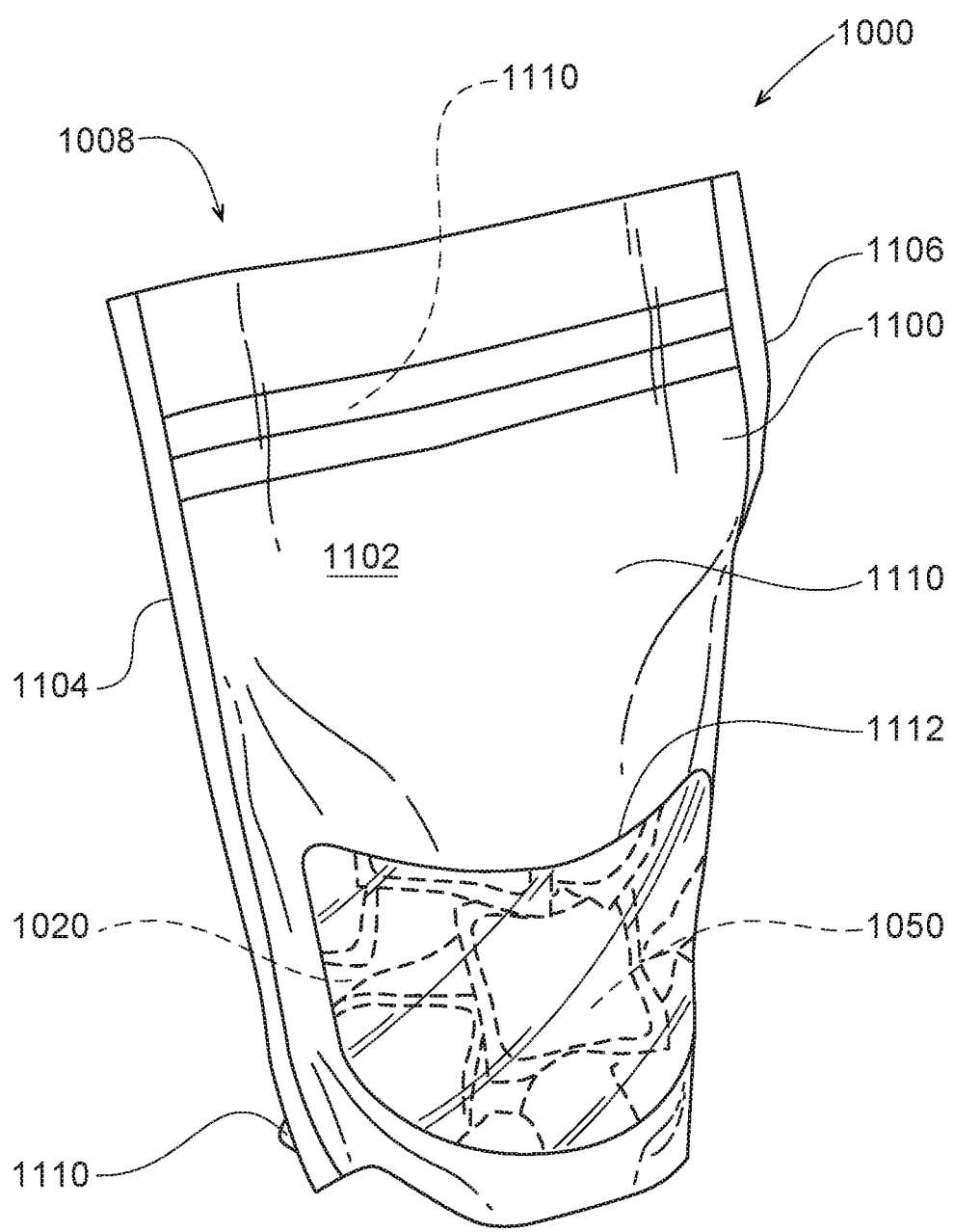
FIG. 1 shows a flexible bag.

The present disclosure relates to container systems that include closeable containers that have at least one pouch contained therein, where the pouch includes a water-soluble film and a household care composition, which includes perfume and organic solvent, at least partially enclosed in a compartment by the water-soluble film. Without wishing to be bound by theory, it is believed that careful selection of a film having a particular polyvinyl alcohol resin blend for such pouches can result in a pleasant perfume bloom upon opening a sealed container while minimizing other leakage of pouch ingredients (e.g., organic solvent), as such leakage may lead to problems such as product instability and/or loss of pouch integrity. In particular, the films of the present disclosure relate to polyvinyl alcohol resin blends that include at least one polyvinyl alcohol polymer that includes an anionic monomer unit.

Definitions

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

The pouches of the present disclosure may contain a composition, for example a household care composition. The composition can be selected from a liquid, solid or combination thereof. As used herein, "liquid" includes free-flowing liquids, as well as pastes, gels, foams and mousses. Non-limiting examples of liquids include light duty and heavy duty liquid detergent compositions, fabric enhancers, detergent gels commonly used for laundry, bleach and laundry additives. Gases, e.g., suspended bubbles, or solids, e.g. particles, may be included within the liquids. A "solid" as used herein includes, but is not limited to, powders, agglomerates, and mixtures thereof. Non-limiting examples of solids include: granules, micro-capsules, beads, noodles, and pearlised balls. Solid compositions may provide a technical benefit including, but not limited to, through-the-wash benefits, pre-treatment benefits, and/or aesthetic effects.

As used herein, the term "homopolymer" generally includes polymers having a single type of monomeric repeating unit (e.g., a polymeric chain consisting of or consisting essentially of a single monomeric repeating unit). For the particular case of PVOH, the term "homopolymer" (or "PVOH homopolymer" or "PVOH polymer") further includes copolymers having a distribution of vinyl alcohol monomer units and vinyl acetate monomer units, depending on the degree of hydrolysis (e.g., a polymeric chain consisting of or consisting essentially of vinyl alcohol and vinyl acetate monomer units). In the limiting case of 100% hydrolysis, a PVOH homopolymer can include a true homopolymer having only vinyl alcohol units.

As used herein, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of PVOH, the term "copolymer" (or "PVOH copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units, for example anionic monomer units). In the limiting case of 100% hydrolysis, a PVOH copolymer can include a copolymer having vinyl alcohol units and one or more other monomer units, but no vinyl acetate units.

As used herein and unless specified otherwise, the terms "wt. %" and "wt %" are intended to refer to the composition of the identified element in "dry" (non water) parts by weight of the entire film (when applicable) or parts by weight of the entire composition enclosed within a pouch (when applicable). As used herein and unless specified otherwise, the term "phr" is intended to refer to the composition of the identified element in parts per one hundred parts water-soluble polymer (or resin; whether PVOH or otherwise) in the water-soluble film.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Container

The container systems of the present disclosure relate to containers. The containers described herein are closeable, and are typically delivered at least to the consumer as closed containers. The container may be re-closeable once opened, particularly when the container contains more than one of the pouches described herein. The container may not be re-closeable and may be intended to be discarded upon a first opening, particularly when the container contains only one of the pouches described herein.

The containers of the present disclosure may have walls that define an interior space. The container may have a bottom wall and one or more side walls. The one or more side walls may be connected to the bottom wall, and the walls together may define the interior space. One or more of the walls may be transparent, translucent, or opaque, either partially or completely. Transparent or translucent walls or even opaque walls that include a transparent or translucent window are useful for showing the pouches inside the container, for example to indicate the number or volume remaining in the container. Opaque walls are useful when it is desired that the pouches be unseen when inside the container.

The interior space may have any volume that is suitable for containing one or more of the pouches described herein. The interior space may have a volume that is suitable for containing only one pouch. The interior space may have a volume that is suitable for containing about five, or about ten, or about fifteen, or about twenty, or about thirty-five, or about fifty-five, or about seventy-five, or about one hundred of the pouches described herein. The size of the container can be selected by one of ordinary skill to adequately fit the desired number and/or size of pouches.

The containers may have an opening suitable for adding and/or dispensing the pouches described herein. Particularly when the container is resealable, the opening may be selectively closeable and/or selectively openable.

As shown in FIGS. 1-4, the container 1000 may be any container that is suitable to contain the pouches 1050 described herein. The container 1000 may be selected from a flexible bag 1100 and a rigid tub 1200.

Figure 2:
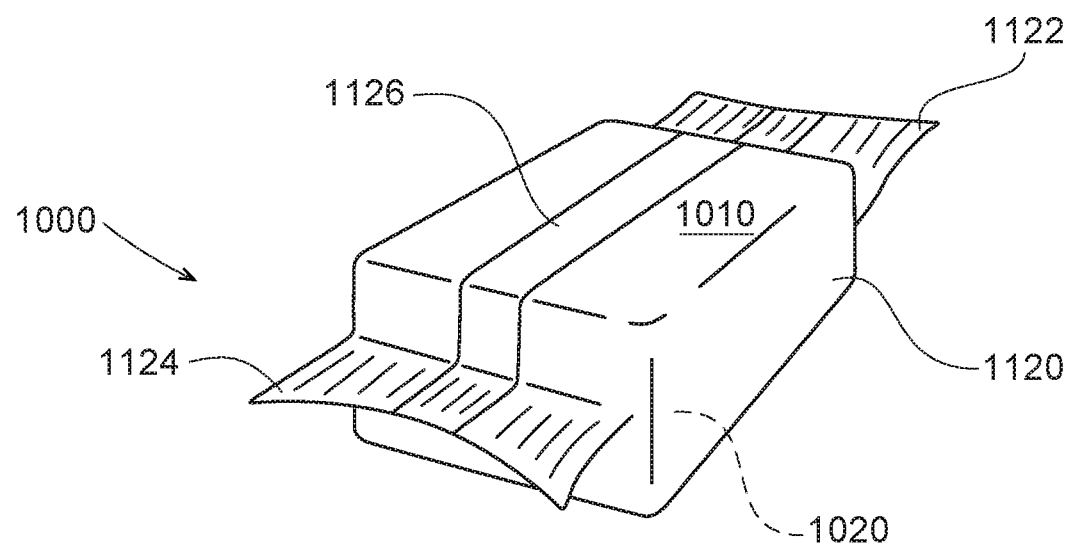
FIG. 2 shows a flexible flow-wrapped bag.

As shown in FIGS. 1 and 2, the container 1000 may be a flexible bag 1100. Suitable bags may be made from materials such as film-forming plastics, such as polyethylene terephthalate, polyethylene, Nylon™, Barex™, Evoh™, and combinations thereof. As shown in FIG. 1, the bag 1100 may include walls 1010, which may be made from panels 1102 that are joined together at edges 1104, 1106, forming an interior space 1020 therebetween. Non-limiting examples of joining processes include ultrasonic welding, autogenous bonding, pressure sealing, adhesive sealing and combinations thereof. The panels 1102 may include layers that are laminated together. The bag 1100 may include a window 1112, through which the contained pouches may be viewed. The bag 1100 may be partially or completely opaque. The flexible bag 1100 that be resealable once opened. Typically, such bags 1100 include recloseable openings 1108. The panels 1102 of a resealable flexible bag 1100 may be selectively engageable near the recloseable opening 1108. The panels 1102 may include an adhesive, or the panels 1102 may include a zipper 1110 having complementary zipper profiles. The zipper profiles may have interlocking members in the form of hooks, male and female members, etc. The zipper 1110 may be press-and-seal type zipper, and/or it may include a slider to facilitate opening and/or closing. The flexible bag 1100 may include a removeable hood that can be removed to expose the zipper 1110.

The container 1000 may be a flexible bag 1100 that is a flow-wrapped bag 1120, as shown in FIG. 2. Flow-wrapped bags 1120 typically enclose a single pouch, e.g. used for sampling, allowing the consumers to experience the product perfume when opening the flow wrap. Typically, flow-wrap bags 1120 are intended for one-time usage and do not include reclosing means. The wall 1010 of the bag 1120 may be wrapped into a type of tube that defines an interior space 1020. The flow-wrapped bag 1020 may include end seals 1122, 1124, where the material of the wall 1010 may be joined to itself. The bag 1020 may also include a length seal 1126 that stretches from one end seal 1122 to the other 1124.

Figure 3:
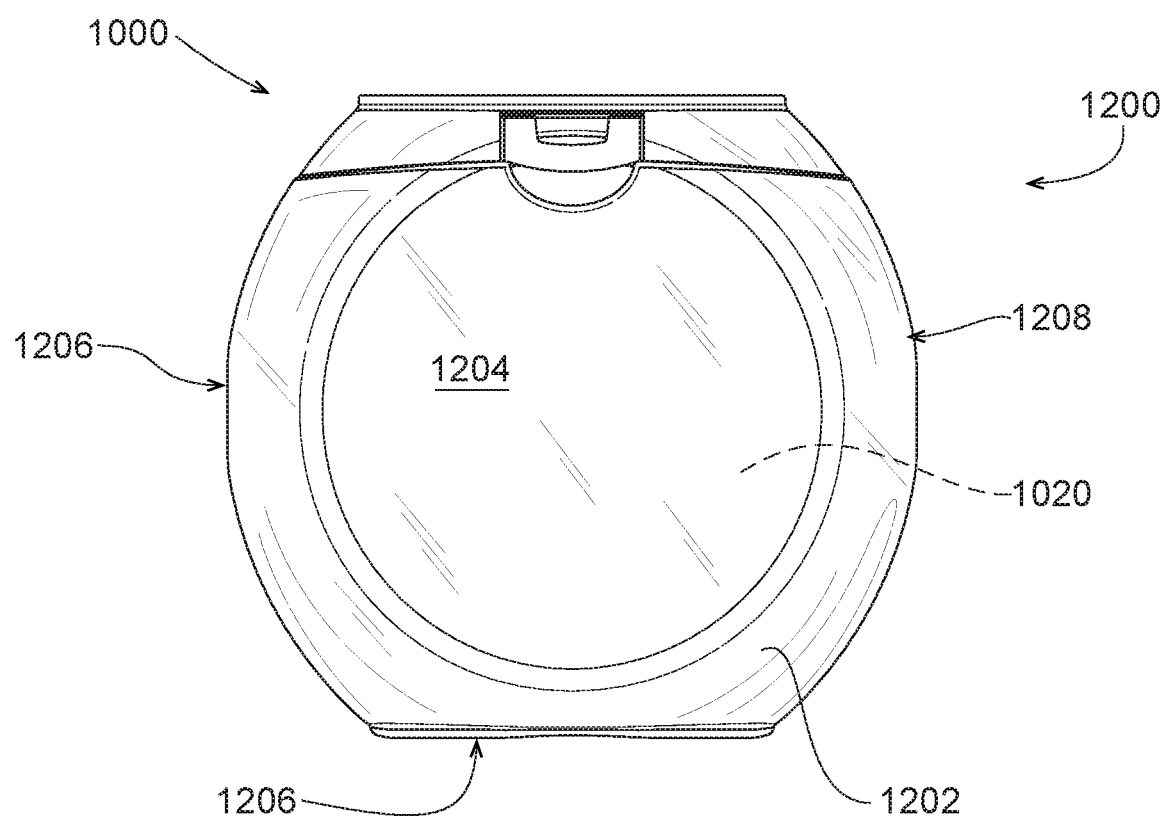
FIG. 3 shows a rigid container.
Figure 4:
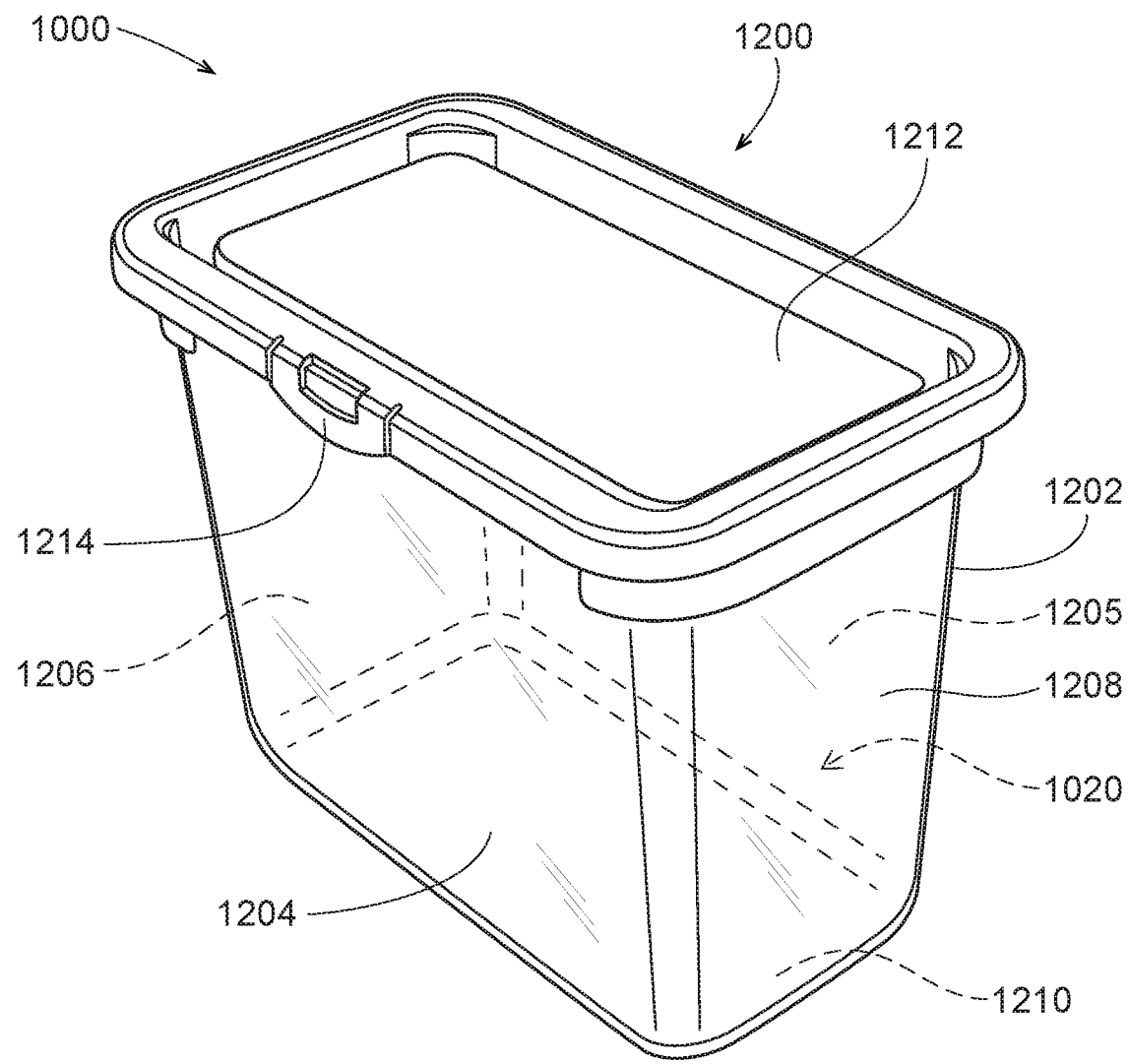
FIG. 4 shows a rigid container.

As shown in FIGS. 3 and 4, the container 1000 may be a rigid tub 1200. The tub may include lid 1212 and a container body 1202. The tub 1200 or portions thereof may be made from materials such as a suitable plastic material such as polyethylene terephthalate or any suitable polyolefin and/or polyester. The body 1202 of the tub 1200 may include a front wall 1204, a rear wall 1205, side walls 1206, 1208, and a bottom wall 1210, forming an interior space 1020 therebetween. The lid 1212 or portions thereof may be formed partially or wholly of a moldable thermoplastic material, such as polypropylene, polyethylene, polystyrene, acrylonitryl butadiene styrene (ABS), polyester, polyvinyl chloride, polycarbonate or elastomer, or a blend of these materials. The tub 1200 or portions thereof may be molded, for example, by injection molding, stretch molding, or blow molding. The lid 1212 may be able to be moved from a closed position to an open position, which may enable the tub to be resealed once opened. The lid 1212 may be a hinged lid, hingedly connected to the container by a hinge and capable of rotating from a closed position to an open position. The lid 1212 may include a locking mechanism 1214, such as a latch, that helps to keep the lid 1212 in a closed position. The lid 1212 may include threads that can selectively engage with threads near an opening of the container, such as on a container neck. Threaded lids may be opened by rotating the lid in an opening direction, and closed by rotating the lid in a closing direction, typically counter to the opening direction. The tub may include a transition piece or collar between the container body and the lid.

The container may limit the ingress and/or egress of water, including water vapor, into the container, particularly as the container is intended to contain pouches that include water-sensitive film. When the opening is in a closed position, the package may have a moisture vapor transfer rate (MVTR) of less than about 2.0 grams per day per square meter of package surface (g/day/m^2), or less than about 1.0 g/day/m^2, or less than about 0.75 g/day/m^2, or less than about 0.50 g/day/m^2, or less than about 0.25 g/day/m^2, at 35° C. and 65% relative humidity. MVTR measurement of MVTR is determined according to the method disclosed in ASTM D7709. Containers that limit the ingress/egress of water and/or water vapor may also be useful in containing volatile perfumes, so that an adequate volume of perfume can build up in the headspace of the container to enable a desirable perfume bloom upon opening the container.

Pouches

The container systems described herein may include at least one pouch. The pouches may include water-soluble film. The film may be formed into a compartment, which may at least partially or completely enclose a composition. The composition may be a household care composition at least partially enclosed in a compartment by the water-soluble film. Suitable films and household care compositions are described in more detail herein.

Figure 5:
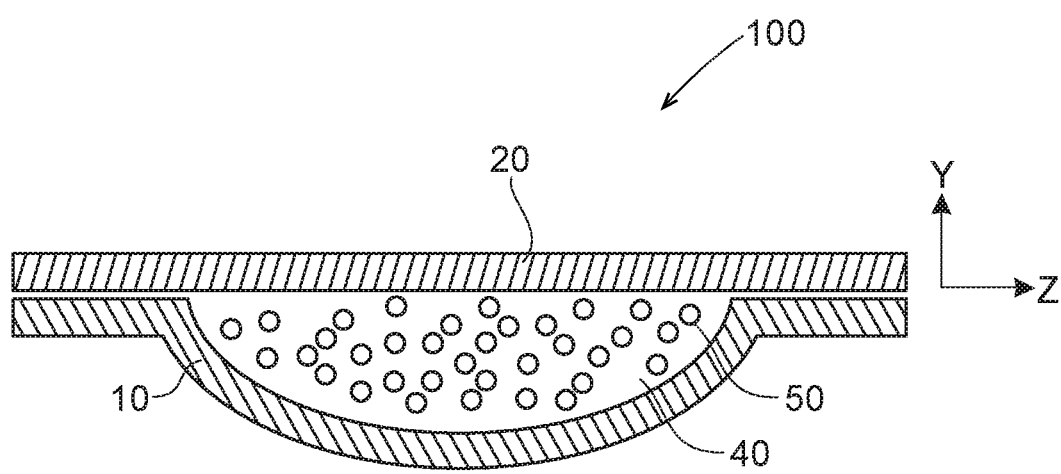
FIG. 5 is a side cross-sectional view of a pouch.

The pouches typically include at least one sealed compartment. The pouches may comprise a single compartment or multiple compartments, such as at least two compartments or at least three compartments. FIG. 5 1 illustrates an article in which a water-soluble pouch 100 is formed from water-soluble polymer films 10, 20 sealed at an interface 30. One or both of the films 10, 20 include the PVOH resin blend of the first PVOH polymer and the second PVOH polymer. The films 10, 20 define an interior pouch container volume 40 which contains any desired composition 50 for release into an aqueous environment. The composition 50 is not particularly limited, for example including any of the variety of cleaning compositions described below. In embodiments comprising multiple compartments, each compartment may contain identical and/or different compositions. In turn, the compositions may take any suitable form including, but not limited to liquid, solid and combinations thereof (e.g. a solid suspended in a liquid). The pouches may comprise a first, second and third compartment, each of which respectively contains a different first, second, and third composition.

Figure 6:
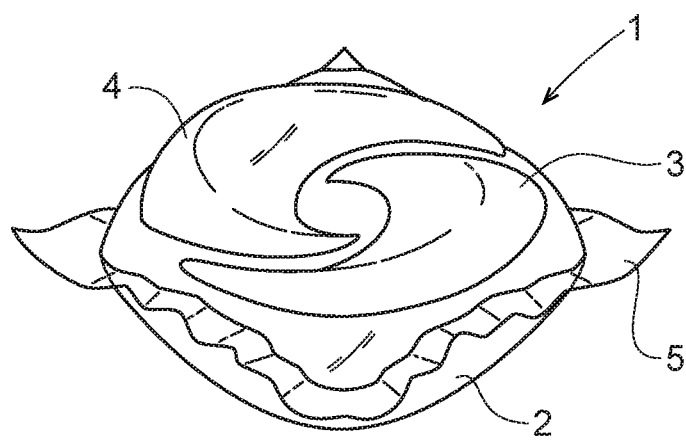
FIG. 6 shows a multi-compartment pouch.

FIG. 6 illustrates an article in which a water-soluble multi-compartment pouch 1 is formed from water-soluble film 5. The pouch 1 has three compartments; two smaller compartments 3, 4 are superposed on a larger bottom compartment 2.

The compartments of multi-compartment pouches may be of the same or different size(s) and/or volume(s). The compartments of the present multi-compartment pouches can be separate or conjoined in any suitable manner. The second and/or third and/or subsequent compartments may be superimposed on the first compartment. The third compartment may be superimposed on the second compartment, which may in turn be superimposed on the first compartment in a sandwich configuration. Alternatively the second and third compartments may be superimposed on the first compartment. However, it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment. The first compartment may be surrounded by at least the second compartment, for example in a tire-and-rim configuration, or in a pouch-in-a-pouch configuration.

Multi-compartment pouches may comprise three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. The second and optionally third compartment may each have a different geometry and shape as compared to the first compartment. The second and optionally third compartments may be arranged in a design on the first compartment. The design may be decorative, educative, or illustrative, for example to illustrate a concept or instruction, and/or used to indicate origin of the product. The first compartment may be the largest compartment having two large faces sealed around the perimeter, and the second compartment is smaller covering less than about 75%, or less than about 50% of the surface area of one face of the first compartment. When there is a third compartment, the aforementioned structure may be the same but the second and third compartments cover less than about 60%, or less than about 50%, or less than about 45% of the surface area of one face of the first compartment.

The articles, pouches, and/or packets of the present disclosure may comprise one or more different films. For example, when the pouch includes a single compartment, the pouch may be made from one wall that is folded onto itself and sealed at the edges, or alternatively, two walls that are sealed together at the edges. When the pouch includes multiple compartments, the pouch may be made from one or more films such that any given packet compartment may comprise walls made from a single film or multiple films having differing compositions. A multi-compartment pouch may comprise at least three walls: an outer upper wall; an outer lower wall; and a partitioning wall. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment.

Articles such as pouches and packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which articles such as packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 150 ml, or about 20 to about 100 ml, and the mold sizes are adjusted accordingly.

The pouch may comprise a first and a second sealed compartment. The second compartment may be in a generally superposed relationship with the first sealed compartment such that the second sealed compartment and the first sealed compartment share a partitioning wall interior to the pouch.

The pouch may comprise a first and a second compartment further comprises a third sealed compartment. The third sealed compartment is in a generally superposed relationship with the first sealed compartment such that the third sealed compartment and the first sealed compartment share a partitioning wall interior to the pouch.

The first composition and the second composition may be selected from one of the following combinations: liquid, liquid; liquid, powder; powder, powder; and powder, liquid. The first, second and third compositions may be selected from one of the following combinations: solid, liquid, liquid; and liquid, liquid, liquid; liquid, solid, liquid; solid, liquid, solid; and solid, solid, solid.

The single compartment or plurality of sealed compartments may contain a composition. The plurality of compartments may each contain the same or a different composition. The composition may be in a form selected from a liquid, solid, or combination thereof. The composition may be in the form of a liquid, solid, a powder, beads, or mixtures thereof.

The composition may be a household care composition, for example a household care composition selected from the group of light duty liquid detergents compositions, heavy duty liquid detergent compositions, hard surface cleaning compositions including hand dishwashing or automatic dishwashing compositions, detergent gels commonly used for laundry, bleaching compositions, laundry additives, fabric enhancer compositions, shampoos, body washes, other personal care compositions, and mixtures thereof.

Pouches may be made according to any suitable method. For example, the method may include the steps of: providing a water-soluble film as described herein; shaping the film to form an open compartment; providing the composition to the open compartment; and sealing the open compartment, e.g., with a second water soluble film, to form a pouch having a sealed compartment having the composition enclosed therein.

The different compartments of a multi-compartment pouches may be made together in a side-by-side style wherein the resulting, cojoined pouches may or may not be separated by cutting. Alternatively, the compartments can be made separately.

Pouches may be made according to a process comprising the steps of: a) forming a first compartment (as described above); b) forming a recess within some or all of the closed compartment formed in step (a), to generate a second molded compartment superposed above the first compartment; c) filling and closing the second compartments by means of a third film; d) sealing the first, second and third films; and e) cutting the films to produce a multi-compartment pouch. The recess formed in step (b) may be achieved by applying a vacuum to the compartment prepared in step (a).

Second and/or third compartment(s) can be made in a separate step and then combined with the first compartment as described in European Patent Application Number 08101442.5 or WO 2009/152031.

Pouches may be made according to a process comprising the steps of: a) forming a first compartment, optionally using heat and/or vacuum, using a first film on a first forming machine; b) filling the first compartment with a first composition; c) on a second forming machine, deforming a second film, optionally using heat and vacuum, to make a second and optionally third molded compartment; d) filling the second and optionally third compartments; e) sealing the second and optionally third compartment using a third film; f) placing the sealed second and optionally third compartments onto the first compartment; g) sealing the first, second and optionally third compartments; and h) cutting the films to produce a multi-compartment pouch.

The first and second forming machines may be selected based on their suitability to perform the above process. The first forming machine may be a horizontal forming machine, and the second forming machine may be a rotary drum forming machine, for example located above the first forming machine.

It should be understood that by the use of appropriate feed stations, it may be possible to manufacture multi-compartment pouches incorporating a number of different or distinctive compositions and/or different or distinctive liquid, gel or paste compositions.

The film and/or pouch may be sprayed or dusted with a suitable material, such as an active agent, a lubricant, an aversive agent, or mixtures thereof. The film and/or pouch may be printed upon, for example, with an ink and/or an active agent.

Water-Soluble Film

The present disclosure relates to pouches that include water-soluble film. The water-soluble film may at least partially or completely enclose a household care composition in a compartment. The films described herein include a polyvinyl alcohol (PVOH) resin blend. The PVOH resin blend includes at least a first PVOH polymer and a second PVOH polymer, as described in more detail below.

Polyvinyl Alcohol Polymers

The water-soluble film includes a blend of polyvinyl alcohol (PVOH) polymers, and may include homopolymers thereof (e.g., including substantially only vinyl alcohol and vinyl acetate monomer units, if any) and copolymers thereof (e.g., including one or more other monomer units in addition to vinyl alcohol and optionally vinyl acetate units). PVOH is a synthetic resin generally prepared by the alcoholysis, usually termed hydrolysis or saponification, of polyvinyl acetate.

Some water-soluble polymeric films that are used to make articles such as pouches (e.g., that can contain a household care composition therein) will incompletely dissolve in water during normal use, for example during a laundry wash cycle for packets containing a laundry-related composition (e.g., thereby leaving film residue on items within the wash).

Water-soluble polymeric films based on PVOH can be subject to changes in solubility characteristics. The acetate group in the co-poly(vinyl acetate vinyl alcohol) polymer is known by those skilled in the art to be hydrolysable by either acid or alkaline hydrolysis. As the degree of hydrolysis increases, a polymer composition made from the PVOH homopolymer resin will have increased mechanical strength but reduced solubility at lower temperatures (e.g., requiring hot water temperatures for complete dissolution). Accordingly, exposure of a PVOH homopolymer resin to an alkaline environment (e.g., resulting from a laundry bleaching additive) can transform the resin from one which dissolves rapidly and entirely in a given aqueous environment (e.g., a cold water medium) to one which dissolves slowly and/or incompletely in the aqueous environment, potentially resulting in undissolved polymeric residue at the end of a wash cycle. This is an inherent weakness in the application of films based on just the vinyl acetate/alcohol co-polymer typified by commercial PVOH homopolymer resins.

PVOH copolymer resins with pendant carboxyl groups, such as vinyl alcohol/hydrolyzed methyl acrylate sodium salt resins, can form lactone rings between neighboring pendant carboxyl and alcohol groups, thus reducing the water solubility of the PVOH copolymer resin. In the presence of a strong base such as a laundry bleaching additive, the lactone rings can open over the course of several weeks at relatively warm (ambient) and high humidity conditions (e.g., via lactone ring-opening reactions to form the corresponding pendant carboxyl and alcohol groups with increased water solubility). Thus, contrary to the effect observed with PVOH homopolymer films, it is believed that such a PVOH copolymer film can become more soluble due to chemical interactions between the film and an alkaline composition inside the pouch during storage. Consequently, as they age, the packets may become increasingly prone to premature dissolution during a hot wash cycle (nominally 40° C.), and may in turn decrease the efficacy of certain laundry actives due to the presence of the bleaching agent and the resulting pH influence. Alternatively, when in contact with a substantially neutral pH, e.g. 7 to 8, composition, the amount of lactone rings might increase, rendering the film potentially insoluble under colder use applications.

At least some or all of the problems described herein can be addressed by providing pouches that include films having a carefully selected PVOH resin blend. The present disclosure relates to pouches comprising water-soluble film including a polyvinyl alcohol (PVOH) resin blend and optionally one or more additional components such as plasticizers, fillers, surfactants, and other additives as described in more detail below.

Fully hydrolyzed PVOH, wherein virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50° F. (10° C.). An intermediate cold or hot water soluble film can include, for example, intermediate partially-hydrolyzed PVOH (e.g., with degrees of hydrolysis of about 94% to about 98%), and is readily soluble only in warm water—e.g., rapid dissolution at temperatures of about 40° C. and greater. Both fully and partially hydrolyzed PVOH types are commonly referred to as PVOH homopolymers although the partially hydrolyzed type is technically a vinyl alcohol-vinyl acetate copolymer.

The degree of hydrolysis (DH) of the PVOH polymers included in the water-soluble films of the present disclosure may be in a range of about 75% to about 99% (e.g., about 79% to about 92%, about 86.5% to about 89%, or about 88%, such as for cold-water soluble compositions; about 90% to about 99%, about 92% to about 99%, or about 95% to about 99%). As the degree of hydrolysis is reduced, a film made from the resin will have reduced mechanical strength but faster solubility at temperatures below about 20° C. As the degree of hydrolysis increases, a film made from the polymer will tend to be mechanically stronger, and the thermoformability and/or dissolution, especially at colder wash temperatures, will tend to decrease.

The degree of hydrolysis of the PVOH may be chosen such that the water-solubility of the polymer is temperature dependent, and thus the solubility of a film made from the polymer, any compatibilizer polymer, and additional ingredients is also influenced. In one option the film is cold water-soluble. A cold water-soluble film, soluble in water at a temperature of less than 10° C., can include PVOH with a degree of hydrolysis in a range of about 75% to about 90%, or in a range of about 80% to about 90%, or in a range of about 85% to about 90%. In another option the film is hot water-soluble. A hot water-soluble film, soluble in water at a temperature of at least about 60° C., can include PVOH with a degree of hydrolysis of at least about 98%.

The water-soluble polymers (e.g., the PVOH resin blend alone or in combination with other water-soluble polymers) can be included in the film in an amount in a range of from about 30 wt. %, or about 40 wt. %, about 50 wt. %, or about 60 wt. %, and/or to about 70 wt. %, or about 80 wt. %, or about 90 wt. %, or about 95 wt. %. For example, the PVOH resin blend may be present in the water-soluble film in an amount in a range of about 30 wt. %, or about 40 wt. %, about 50 wt. %, about 60 wt. %, and/or to about 70 wt. %, or about 80 wt. %, or about 90 wt. %, or about 95 wt. %, by weight of the film.

The water-soluble film may contain at least about 50 wt. %, 55 wt. %, 60 wt. %, 65 wt. %, 70 wt. %, 75 wt. %, 80 wt. %, 85 wt. %, or 90 wt. % and/or up to about 60 wt. %, 70 wt. %, 80 wt. %, 90 wt. %, 95 wt. %, or 99 wt. % of the PVOH resin blend. Preferably the resin blend is present in the film from about 50% to about 80%, more preferably from about 60% to about 75%.

The first PVOH polymer may be present in the water-soluble film in an amount in a range of about 10 wt. % to about 90 wt. %, or about 10 wt. % to about 70 wt. %, or about 10 wt. % to about 65 wt. %, or about 10 wt. % to about 60 wt. %, or about 20 wt. % to about 50 wt. %, or about 30 wt. % to about 40 wt. % of total PVOH polymers in the film (i.e., relative to the PVOH resin blend weight). For example, the first PVOH polymer may be present in an amount of at least about 10 wt. %, 20 wt. %, 30 wt. %, 40 wt. %, 50 wt. %, 60 wt. %, and/or up to about 90 wt. %, 80 wt. %, 70 wt. %, 60 wt. %, 50 wt. %, 40 wt. %, 30 wt. %, 20 wt. %, or 10 wt. %, of total PVOH polymers in the film. The foregoing concentrations of first PVOH polymer alternatively or additionally can be relative to total water-soluble polymer content in film, PVOH or otherwise.

The second PVOH polymer may be present in an amount in a range of about 10 wt. % to about 90 wt. %, or from about 30 wt. % to about 90 wt. %, or from about 40 wt. % to about 90 wt. %, or from about 50 wt. % to about 80 wt. %, or from about 60 wt. % to about 70 wt. %, of total PVOH polymers in the film (i.e., relative to the PVOH resin blend weight). For example, the second PVOH polymer may be present in an amount of at least 10 wt. %, 20 wt. %, 30 wt. %, 40 wt. %, 50 wt. %, or 60 wt. % and/or up to about 90 wt. %, 80 wt. %, 70 wt. %, 65 wt. %, 60 wt. %, 50 wt. %, or 40 wt. % of total PVOH polymers in the film. The foregoing concentrations of second PVOH polymer alternatively or additionally can be relative to total water-soluble polymer content in film, PVOH or otherwise.

The water-soluble polymers (e.g., the PVOH resin blend alone or in combination with other water-soluble polymers) can be included in the film in an amount in a range of about 30 wt. % or 50 wt. % to about 90 wt. % or 95 wt. %, for example.

The weight ratio of the amount of all water-soluble polymers as compared to the combined amount of all plasticizers, including water, compatibilizing agents, and secondary additives can be in a range of about 0.5 to about 18, about 0.5 to about 15, about 0.5 to about 9, about 0.5 to about 5, about 1 to 3, or about 1 to 2, for example. Preferably this ratio is from about 1 to about 3, more preferably from about 1.3 to about 2.5. The specific amounts of plasticizers and other non-polymer component can be selected in a particular embodiment based on an intended application of the water-soluble film to adjust film flexibility and to impart processing benefits in view of desired mechanical film properties.

As described in more detail below, the PVOH polymers may be characterized in terms of their viscosities (the values of which generally correlate to the molecular weights of the polymers). The viscosity of a polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. Polymeric viscosities specified herein in cP should be understood to refer to the viscosity of a 4% aqueous water-soluble polymer solution at 20° C., unless specified otherwise. For reference, the first PVOH polymer may be denoted as having a first 4% solution viscosity at 20° C. ($\mu_1$), and the second PVOH polymer may be denoted as having a second 4% solution viscosity at 20° C. ($\mu_2$).

The first PVOH polymer may be characterized by a 4% solution viscosity at 20° C. ($\mu_1$) of from about 10 cP to about 40 cP, or from about 10 cP to about 30 cP, or from about 12 cP to about 25 cP, or from 14 cP to 20 cP. The first viscosity $\mu_1$ may be in a range of about 4 cP to about 24 cP (e.g., at least about 4, 8, 10 or 12 cP and/or up to about 12, 16, 20, or 24 cP, such as about 10 cP to about 16 cP or about 10 cP to about 20 cP). The second PVOH polymer may be characterized by a 4% solution viscosity at 20° C. ($\mu_2$) of from about 10 cP to about 40 cP, or from about 10 cP to about 30 cP, or from about 12 cP to about 25 cP. The second viscosity $\mu_2$ may be in a range of about 4 cP to about 24 cP (e.g., at least about 4, 8, 10 or 12 cP and/or up to about 12, 16, 20, or 24 cP, such as about 10 cP to about 16 cP or about 10 cP to about 20 cP). The second PVOH polymer can have a second 4% solution viscosity at 20° C. ($\mu_2$) of about 20 cP or less (e.g., at least about 4, 8, 10, or 12 cP and/or up to about 12, 16, or 20 cP). An absolute viscosity difference $|\mu_2-\mu_1|$ for the first PVOH polymer and the second PVOH polymer may be in a range of 0 cP to about 10 cP, preferably from about 2 cP to about 8 cP, or at least about 0, 0.5, 1, or 2 cP and/or up to about 1, 2, 5, or 10 cP, such as from about 0 cP to about 5 cP, or from about 0 cP to about 2 cP.

It is well known in the art that the viscosity of a water-soluble polymer (PVOH or otherwise) is correlated with the weight-average molecular weight (Mw) of the same polymer, and often the viscosity is used as a proxy for (Mw). Thus, the weight-average molecular weight of the water-soluble polymers, including the first PVOH copolymer and second PVOH polymer, can be in a range of about 30,000 to about 175,000, or about 30,000 to about 100,000, or about 55,000 to about 85,000, for example.

The PVOH resin blend may consist essentially of the first PVOH polymer and the second PVOH polymer.

When the PVOH resin blend includes three or more PVOH resins selected from PVOH polymer and PVOH copolymer resins, the foregoing viscosity values can apply to each PVOH polymer or PVOH copolymer individually and the foregoing viscosity differences can apply to each PVOH polymer/PVOH copolymer pair in the PVOH resin blend and resulting water-soluble film.

As described above, PVOH polymers may be characterized by a degree of hydrolysis.

The first PVOH polymer may be characterized by a degree of hydrolysis of 60% to about 99%, preferably from about 80% to about 98%, preferably from about 85% to about 95%, preferably from about 87% to about 92%. The second PVOH polymer may be characterized by a degree of hydrolysis of from about 60% to about 99%, preferably from about 80% to about 98%, preferably from about 85% to about 95%, preferably from about 87% to about 92%.

The water-soluble film may have a residue value of about 48 wt. % or less as measured by the Dissolution Chamber Test. The water-soluble film may have an average tensile strength value of at least about 33 MPa as measured by the Tensile Strength Test. The water-soluble film may have a modulus value of at least about 12 N/mm$^2$ as measured by the Modulus Test. The test methods for each are provided herein.

The particular chemistries of the first and second PVOH polymers are described in more detail below.

a. First PVOH Polymer

The PVOH resin blends described herein may include a first PVOH polymer. The first PVOH polymer may include a first anionic monomer unit. The first PVOH polymer may be a PVOH terpolymer including vinyl alcohol monomer units, vinyl acetate monomer units (i.e., when not completely hydrolyzed), and a single type of anionic monomer unit (e.g., a where a single type of monomer unit can include equivalent acid forms, salt forms, and optionally residual ester forms of the anionic monomer unit). The PVOH copolymer can include two or more types of anionic monomer units.

The first anionic monomeric unit may be derived from a member of the group consisting of vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, salts of the forgoing, preferably alkali metal salts of the foregoing, esters of the foregoing, and combinations thereof.

The anionic monomer unit in the first PVOH polymer may be a carboxylated anionic monomer unit. As used herein, a "carboxylated anionic monomer unit" includes the vinyl polymerization units corresponding to monocarboxylic acid vinyl monomers, their esters and anhydrides, dicarboxylic monomers having a polymerizable double bond, their esters and anhydrides, and salts, preferably alkali metal salts, of any of the foregoing.

Examples of suitable carboxylated anionic monomer units include the vinyl polymerization units corresponding to vinyl anionic monomers including vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations thereof (e.g., multiple types of anionic monomers or equivalent forms of the same anionic monomer). The carboxylated anionic monomer unit may be derived from maleic acid, monoalkyl maleate, dialkyl maleate, maleic anhydride, and combinations thereof. The carboxylated anionic monomer unit may be derived from a monoalkyl maleate monomer unit. The monoalkyl maleate monomer unit may be derived from a member of the group consisting of monomethyl maleate, alkali metals salts thereof (e.g., sodium salts), and combinations thereof.

The one or more anionic monomer units may be incorporated or present in the first PVOH polymer at a given amount. Typically, as anionic monomer content increases, so does solubility of the PVOH polymer resin, resin blends, and/or films made from such resins or resin blends. Films that include PVOH polymers having higher anionic monomer contents also may have relatively greater tackiness, which may be indicative of greater sealability. However, a water soluble film where the relative tackiness is too high may not be desired due to challenges converting tacky films into pouches.

The amount of anionic monomer units may be characterized in terms of the molar content (expressed, e.g., as mol. %) of the anionic monomer units in a PVOH polymer. The one or more anionic monomer units may be present in the first PVOH polymer in an amount in a range of from about 1 mol. % to about 5 mol. %, or from about 2 mol. % to about 4 mol. %, or from about 2 mol. % to about 5 mol. %, or from about 3 mol. % to about 5 mol. %, or from about 3.5 mol. % to about 4.5 mol. %, or from about 4 mol. % to about 4.5 mol. %, individually or collectively. The one or more anionic monomer units may be present in the first PVOH polymer in an amount in a range of from about 1 mol. % to about 4 mol. %, or from about 1 mol. % to about 3 mol. %. The anionic monomer unit(s) may be present in the first PVOH polymer in an amount of at least about 1.0, 1.5, 2.0, 2.5, 3.0, 3.5, of 4.0 mol. %, and/or up to about 6.0, 5.5, 5.0, 4.5, 4.0, 3.5, 3.0, or 2.5 mol. %.

Alternatively or additionally, the anionic monomer unit(s) may be characterized in terms of the anionic monomer units present in a PVOH film, for example as molar content (mol. %) of the anionic monomer units compared to the total amount of PVOH polymer in the film (e.g., total of PVOH polymer, including homopolymer(s) and copolymer(s), in the PVOH resin blend). The anionic monomer unit(s) may be present in the water-soluble film in an amount in the range of from about 0.5 mol. % to about 5 mol. % of total PVOH polymer in the film. The anionic monomer unit(s) may be present in the film in an amount of at least about 0.5, 0.75, 1.0, or 1.2 mol. %, and/or up to about 5.0, 4.5, 4.0, 3.0, 2.5, 2.0, or 1.7 mol. %, of total PVOH polymer in the film. For example, a first PVOH polymer that includes (carboxylated) anionic monomer units may be blended with a second PVOH polymer, such as a homopolymer, in about a 30 wt %/70 wt % blend to about a 70 wt %/30 wt % blend to achieve an average blend anionic monomer unit content of from about 0.5 mol. % to about 3 mol. % of total PVOH polymer. The foregoing anionic monomer unit content alternatively or additionally may also apply relative to total water-soluble polymer content in film, PVOH or otherwise.

The first PVOH polymer may be present in an amount in a range of about 10 wt. % to about 90 wt. % of total PVOH polymers in the film or about 10 wt. % to about 65 wt. % of total PVOH polymers.

b. Second PVOH Polymer

The PVOH resin blends described herein may include a second PVOH polymer. The second PVOH polymer is selected from a PVOH polymer that includes (a) a second anionic monomeric unit, a vinyl alcohol monomer unit and optionally a vinyl acetate unit, or (b) a PVOH homopolymer consisting of a vinyl alcohol monomer unit and optionally a vinyl acetate unit.

The second PVOH polymer may be a PVOH polymer that includes a second anionic monomeric unit. The second anionic unit may be different than the first anionic monomeric unit, or they may be the same. When the first and second anionic monomeric units are the same, the first and second PVOH polymers are different in some way, for example in terms of respective viscosities or in terms of the respective level of incorporation of the anionic monomeric units.

The second anionic monomeric unit may be selected from the group consisting of vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing, esters of the foregoing, and combinations thereof. The second anionic monomeric unit may be selected from the group consisting of acrylamido methylpropanesulfonic acids, alkali metal salts thereof, and combinations thereof. The first anionic monomeric unit in the first PVOH polymer may be selected from the group consisting of monomethyl maleate, alkali metal salts thereof, and combinations thereof, and the second monomeric unit in the second PVOH polymer may be selected from the group consisting of acrylamido methylpropanesulfonic acids, alkali metal salts thereof, and combinations thereof. The first PVOH polymer may be present in the PVOH blend in a range of from about 50 wt. % to about 90 wt. %, preferably from about 70 wt. % to about 90 wt. %, by weight of the total PVOH polymers in the blend, wherein the first anionic monomeric unit is derived from a member selected from the group consisting of monomethyl maleate, alkali metal salts thereof, and combinations thereof, wherein the second PVOH polymer is present in the PVOH blend in a range of from about 10 wt. % to about 50 wt. %, preferably from about 10 wt. % to about 30 wt. %, by weight of the total PVOH polymers in the blend, and wherein the second monomeric unit is derived from a member selected from the group consisting of acrylamido methylpropanesulfonic acids, alkali metal salts thereof, and combinations thereof.

The second anionic monomer unit may be present in the second PVOH polymer in an amount in a range of about 1.0 mol. % to about 5.0 mol. % of the second PVOH polymer. The second anionic monomer unit is present in the film in an amount in a range of about 0.2 mol. % to about 5.0 mol. %, or from about 0.5 mol. % to about 4.5 mol. %, or from about 1 mol. % to about 3 mol. %, of total PVOH polymers in the film.

The first PVOH polymer may have a first level of incorporation ($a_1$) of the first anionic monomer unit, and the second PVOH polymer may have a second level of incorporation ($a_2$) of the second anionic monomer unit. When the first and second anionic monomer units are the same, the absolute value of $|a_1-a_2|$, may be greater than zero. The value of ($a_1-a_2$) may be greater than zero. It may be that $a_1$ is in a range of about 1 mol. % to about 5 mol. %, preferably from about 1 mol. % to about 3 mol. % of the first PVOH polymer, $a_2$ is in a range of about 1 mol. % to about 5 mol. %, preferably from about 1 mol. % to about 3 mol. % of the second PVOH polymer, and $|a_1-a_2|$, preferably $a_1-a_2$, is in a range of about 0 mol. % to about 3 mol. %, or from about 1 mol. % to about 3 mol. %.

The first anionic monomer unit and the second anionic monomer unit may be together present in a combined amount in a range of about 2.0 mol. % to about 3.5 mol. % of total PVOH polymers in the film.

The second PVOH polymer may be a PVOH homopolymer consisting essentially of vinyl alcohol monomer units and optionally vinyl acetate monomer units.

The second PVOH polymer may be characterized by a 4% solution viscosity at 20° C. ($\Xi_2$) from about about 3.0 cP to about 40 cP, or from about 7 cP to about 40 cP, or from about 10 cP to about 40 cP, or from about 10 cP to about 30 cP, or from about 12 cP to about 25 cP. The first PVOH polymer may be characterized by a first 4% solution viscosity at 20° C. ($\mu_1$, the second PVOH polymer may be characterized by a second 4% solution viscosity at 20° C. ($\mu_2$), and an absolute viscosity difference $|\mu_2-\mu_1|$ for the first PVOH polymer and the second PVOH polymer may be in a range of 0 cP to about 10 cP, preferably of from 2 cP to 8 cP.

The second PVOH polymer may be characterized by a degree of hydrolysis of from about 60% to about 99%, preferably from about 80% to about 98%, preferably from about 83% to about 95%, preferably from about 85% to about 92%.

The second PVOH polymer may be present in an amount in a range of about 10 wt. % to about 90 wt. %, preferably 30 wt % to 80 wt %, more preferably 50 wt % to 70 wt % of total PVOH polymers in the film.

The first PVOH polymer may be present in the PVOH blend in a range of from about 20 wt. % to about 60 wt. %, preferably from about 30 wt. % to about 40 wt. %, by weight of the total PVOH polymers in the blend, wherein the first anionic monomeric unit of the first PVOH polymer is derived from a member selected from the group consisting of monomethyl maleate, alkali metal salts thereof, and combinations thereof, and wherein the second PVOH polymer is a PVOH homopolymer that is characterized by a 4% solution viscosity at 20° C. ($\mu_2$) from about 10 cP to about 30 cP and is present in the PVOH resin blend in a range of from about 40 wt. % to about 80 wt. %, preferably from about 60 wt. % to about 70 wt. %, by weight of the total PVOH polymers in the blend.

Other Film Components/Properties

In addition to the polyvinyl alcohol polymers described above, the water-soluble films of the present disclosure may include other components.

The films of the present disclosure may include other water-soluble polymers. Other water soluble polymers for use in addition to the PVOH polymers and PVOH copolymers in the blend can include, but are not limited to modified polyvinyl alcohols, polyacrylates, water-soluble acrylate copolymers, polyvinyl pyrrolidone, polyethyleneimine, pullulan, water-soluble natural polymers including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, and polymethacrylates. Such water-soluble polymers, whether PVOH or otherwise are commercially available from a variety of sources. Any of the foregoing water-soluble polymers are generally suitable for use as film-forming polymers. In general, the water-soluble film can include copolymers and/or blends of the foregoing resins.

Water-soluble polymers for use in the film described herein (including, but not limited to PVOH polymers and PVOH copolymers) can be characterized by a viscosity in a range of about 3.0 to about 27.0 cP, about 4.0 to about 24.0 cP, about 4.0 to about 23.0 cP, about 4.0 cP to about 15 cP, or about 6.0 to about 10.0 cP, for example. The viscosity of a polymer is determined by measuring a freshly made solution using a Brookfield LV type viscometer with UL adapter as described in British Standard EN ISO 15023-2: 2006 Annex E Brookfield Test method. It is international practice to state the viscosity of 4% aqueous polyvinyl alcohol solutions at 20° C. Polymeric viscosities specified herein in cP should be understood to refer to the viscosity of a 4% aqueous water-soluble polymer solution at 20° C., unless specified otherwise.

It is well known in the art that the viscosity of a water-soluble polymer (PVOH or otherwise) is correlated with the weight-average molecular weight ($\overline{M}w$) of the same polymer, and often the viscosity is used as a proxy for $\overline{M}w$. Thus, the weight-average molecular weight of the water-soluble polymers, including the first PVOH copolymer and second PVOH polymer, can be in a range of about 30,000 to about 175,000, or about 30,000 to about 100,000, or about 55,000 to about 85,000, for example.

The water-soluble film can contain other auxiliary agents and processing agents, such as, but not limited to, plasticizers, plasticizer compatibilizers, surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. Films that include plasticizers are beneficial. The amount of such agents can be up to about 50 wt. %, 20 wt %, 15 wt %, 10 wt %, 5 wt. %, 4 wt % and/or at least 0.01 wt. %, 0.1 wt %, 1 wt %, or 5 wt %, individually or collectively. Preferably the total amount of such auxiliary agents and processing aids in the film is from about 20% to about 50%, more preferably from about 25% to about 40%.

The plasticizer can include, but is not limited to, glycerin, diglycerin, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, polyether polyols, sorbitol, 2-methyl-1,3-propanediol, ethanolamines, and a mixture thereof. A preferred plasticizer is glycerin, sorbitol, triethyleneglycol, propylene glycol, diproylene glycol, 2-methyl-1,3-propanediol, trimethylolpropane, or a combination thereof. The total amount of the plasticizer can be in a range of about 1 wt. % to about 40 wt. %, or 10 wt. % to about 40 wt. %, or about 15 wt. % to about 35 wt. %, or about 20 wt. % to about 30 wt. %, for example about 25 wt. %, based on total film weight. Combinations of glycerin, dipropylene glycol, and sorbitol can be used. Alternatively combinations of glycerin, trimethylolpropane and sorbitol can be used. Optionally, glycerin can be used in an amount of about 5 wt % to about 30 wt %, or 5 wt % to about 20 wt %, e.g., about 13 wt %. Optionally, dipropylene glycol or trimethylpropane can be used in an amount of about 1 wt. % to about 20 wt. %, or about 3 wt. % to about 10 wt. %, for example 6 wt. %. Optionally, sorbitol can be used in an amount of about 1 wt % to about 20 wt %, or about 2 wt % to about 10 wt %, e.g., about 5 wt %. The specific amounts of plasticizers can be selected in a particular embodiment based on desired film flexibility and processability features of the water-soluble film. At low plasticizer levels, films may become brittle, difficult to process, or prone to breaking. At elevated plasticizer levels, films may be too soft, weak, or difficult to process for a desired use.

Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. The amount of surfactant in the water-soluble film may be in a range of about 0.1 wt % to 2.5 wt %, optionally about 1.0 wt % to 2.0 wt %.

Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the water-soluble film may be in a range of about 0.02 wt % to about 1.5 wt %, optionally about 0.1 wt % to about 1 wt %.

The film may include an aversive agent, such as a bittering agent, e.g., denatonium benzoate and/or a derivative thereof. The aversive agent may be mixed with the polymeric material and/or other adjuncts prior to making the film (e.g., prior to casting or extruding the film). Alternatively or additionally, the aversive agent may be added to the film or to the pouch once formed, for example, added by dusting, printing, spraying, or otherwise coating.

Suitable fillers/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. The amount of filler/extender/antiblocking agent/detackifying agent in the water-soluble film may be in a range of about 0.1 wt % to about 25 wt %, or about 1 wt % to about 10 wt %, or about 2 wt. % to about 8 wt. %, or about 3 wt. % to about 5 wt. %. In the absence of starch, one preferred range for a suitable filler/extender/antiblocking agent/detackifying agent is about 0.1 wt % or 1 wt % to about 4 wt % or 6 wt %, or about 1 wt. % to about 4 wt. %, or about 1 wt. % to about 2.5 wt. %.

The water-soluble film can further have a residual moisture content of at least 4 wt. %, preferably in a range of about 4 to about 10 wt. %, as measured by Karl Fischer titration.

The film may be opaque, transparent or translucent. The film may comprise a printed area. The area of print may cover an uninterrupted portion of the film or it may cover parts thereof. The area of print may comprise inks, pigments, dyes, blueing agents or mixtures thereof. The area of print may comprise a single color or maybe comprise multiple colors, even three colors. The print may be present as a layer on the surface of the film or may at least partially penetrate into the film. The film will comprise a first side and a second side. The area of print may be achieved using standard techniques, such as flexographic printing or inkjet printing. The area of print may be on either or both sides of the film. Alternatively, an ink or pigment may be added during the manufacture of the film such that all or at least part of the film is colored.

Other features of water-soluble polymer compositions such as films, may be found in U.S. Publication No. 2011/0189413 and U.S. application Ser. No. 13/740,053, both of which are incorporated by reference herein in their entireties.

Method of Making Film

The water-soluble film may be formed by, for example, admixing, co-casting, or welding the first PVOH copolymer and the second PVOH polymer according to the types and amounts described herein, together with the preferred and optional secondary additives described herein. If the polymers are first admixed then the water-soluble film is preferably formed by casting the resulting admixture (e.g., along with other plasticizers and other additives) to form a film. If the polymers are welded, the water-soluble film can be formed by, for example, solvent or thermal welding. The water-soluble film may be formed by extrusion, for example, blown extrusion.

The film can have any suitable thickness. For example, the film can have a thickness in a range of about 5 to about 200 µm, or in a range of about 20 to about 100 µm, or about 40 to about 85 µm, for example 76 µm. When a pouch is made, for example through thermoforming as described below, the film may be deformed, resulting in varying film thicknesses in a pouch. Therefore, an undeformed thickness of the film may be determined prior to deformation and/or pouch formation.

Optionally, the water-soluble film can be a free-standing film consisting of one layer or a plurality of like layers.

The film described herein can also be used to make an article such as a packet with two or more compartments made of the same film or in combination with films of other polymeric materials. Additional films can, for example, be obtained by casting, blow-molding, extrusion or blown extrusion of the same or a different polymeric material, as known in the art. The polymers, copolymers or derivatives thereof suitable for use as the additional film may be selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of films is characterized by the level of polymer in the pouch material, for example the PVOH resin blend, as described above, being at least 60%.

The weight ratio of the amount of all water-soluble polymers as compared to the combined amount of all plasticizers, compatibilizing agents, and secondary additives can be in a range of from about 0.5 to about 18, about 0.5 to about 15, about 0.5 to about 9, about 0.5 to about 5, about 1 to 3, or about 1 to 2, for example. Preferably this ratio is from about 1 to about 3, more preferably from about 1.3 to about 2.5. The specific amounts of plasticizers and other non-polymer component can be selected in a particular embodiment based on an intended application of the water-soluble film to adjust film flexibility and to impart processing benefits in view of desired mechanical film properties.

Household Care Composition

The present disclosure relates to household care compositions. The household care compositions of the present disclosure may be at least partially enclosed in a compartment by the water-soluble film. A multi-compartment pouch may contain the same or different compositions in each separate compartment.

Non-limiting examples of useful compositions (e.g., household care compositions) include light duty and heavy duty liquid detergent compositions, hard surface cleaning compositions including hand dishwashing or automatic dishwashing compositions, detergent gels commonly used for laundry, bleach and laundry additives, fabric enhancer compositions (such as fabric softeners), shampoos, body washes, and other personal care compositions. Compositions of use in the present pouches may take the form of a liquid, gel, solid or a powder. Liquid compositions may comprise a solid. Solids may include powder or agglomerates, such as micro-capsules, polymeric beads, noodles, or one or more pearlized balls or mixtures thereof. Such a solid element may provide a technical benefit, through the wash or as a pre-treat, delayed or sequential release component; additionally or alternatively, it may provide an aesthetic effect.

Multi-compartment pouches may be useful to keep compositions containing incompatible ingredients (e.g., bleach and enzymes) physically separated or partitioned from each other. It is believed that such partitioning may expand the useful life and/or decrease physical instability of such ingredients. Additionally or alternatively, such partitioning may provide aesthetic benefits as described in European Patent Application Number 09161692.0. Multi-compartment pouches may include a liquid composition in at least one compartment and a solid composition in at least one compartment. Multi-compartment pouches may include liquid compositions in at least two, or even every, compartment.

The compositions encapsulated by the films described herein can have any suitable viscosity depending on factors such as formulated ingredients and purpose of the composition.

The composition may have a high shear viscosity value, at a shear rate of 20 $s^{-1}$ and a temperature of 20° C., of 100 to 3,000 cP, alternatively 300 to 2,000 cP, alternatively 500 to 1,000 cP, and a low shear viscosity value, at a shear rate of 1 $s^{-1}$ and a temperature of 20° C., of 500 to 100,000 cP, alternatively 1000 to 10,000 cP, alternatively 1,300 to 5,000 cP. Methods to measure viscosity are known in the art. According to the present disclosure, viscosity measurements are carried out using a rotational rheometer e.g. TA instruments AR550. The instrument includes a 40 mm 2° or 1° cone fixture with a gap of around 50-60 µm for isotropic liquids, or a 40 mm flat steel plate with a gap of 1000 µm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 $s^{-1}$, and an equilibration of 60 seconds at the selected temperature.

The peak hold involves applying a shear rate of 0.05 s$^{-1}$ at 20° C. for 3 min with sampling every 10 s. The continuous ramp step is performed at a shear rate from 0.1 to 1200 s$^{-1}$ for 3 min at 20° C. to obtain the full flow profile.

Suitable components of the household care compositions are described in more detail below.

Perfume

The household care compositions of the present disclosure comprise perfume. The household care compositions may comprise from about 0.1% to about 10%, or from about 0.1% to about 5%, preferably from about 0.5% to about 4%, more preferably from about 1% to about 3%, by weight of the household care composition, of perfume.

As described in more detail below, the perfume may comprise neat perfume, encapsulated perfume, or mixtures thereof. Preferably, the perfume comprises neat perfume. A portion of the perfume may be encapsulated in a core-shell encapsulate.

As used herein, the term "perfume" encompasses the perfume raw materials (PRMs) and perfume accords. The term "perfume raw material" as used herein refers to compounds having a molecular weight of at least about 100 g/mol and which are useful in imparting an odor, fragrance, essence or scent, either alone or with other perfume raw materials. As used herein, the terms "perfume ingredient" and "perfume raw material" are interchangeable. The term "accord" as used herein refers to a mixture of two or more PRMs.

Typical PRM comprise inter alia alcohols, ketones, aldehydes, esters, ethers, nitriles and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs are characterized by their boiling points (B.P.) measured at the normal pressure (760 mm Hg), and their octanol/water partitioning coefficient (P). Based on these characteristics, the PRMS may be categorized as Quadrant I, Quadrant II, Quadrant III, or Quadrant IV perfumes, as described in more detail below.

Octanol/water partitioning coefficient of a PRM is the ratio between its equilibrium concentration in octanol and in water. The log P of many PRMs has been reported; for example, the Pomona92 database, available from Daylight Chemical Information Systems, Inc. (Daylight CIS), Irvine, Calif., contains many, along with citations to the original literature. However, the log P values are most conveniently calculated by the "C LOG P" program, also available from Daylight CIS. This program also lists experimental log P values when they are available in the Pomona92 database. The "calculated log P" (C log P) is determined by the fragment approach on Hansch and Leo (cf., A. Leo, in Comprehensive Medicinal Chemistry, Vol. 4, C. Hansch, P. G. Sammens, J. B. Taylor and C. A. Ransden, Eds., p. 295, Pergamon Press, 1990, incorporated herein by reference). The fragment approach is based on the chemical structure of each PRM, and takes into account the numbers and types of atoms, the atom connectivity, and chemical bonding. The C log P values, which are the most reliable and widely used estimates for this physicochemical property, are preferably used instead of the experimental log P values in the selection of PRMs which are useful in the present invention.

The boiling points of many PRMs are given in, e.g., "Perfume and Flavor Chemicals (Aroma Chemicals)," S. Arctander, published by the author, 1969, incorporated herein by reference. Other boiling point values can be obtained from different chemistry handbooks and databases, such as the Beilstein Handbook, Lange's Handbook of Chemistry, and the CRC Handbook of Chemistry and Physics. When a boiling point is given only at a different pressure, usually lower pressure than the normal pressure of 760 mm Hg, the boiling point at normal pressure can be approximately estimated by using boiling point-pressure nomographs, such as those given in "The Chemist's Companion,"A. J. Gordon and R. A. Ford, John Wiley & Sons Publishers, 1972, pp. 30-36.

Perfume raw materials having a B.P. lower than 250° C. and a C log P lower than 3.0 are called Quadrant I perfumes. Quadrant I perfumes having a B.P. lower than 250° C. and a C log P between 0 and 3.0 are preferred. Non-limiting examples of Quadrant I perfume raw materials include Allyl Caproate, Arnyl Acetate, Arnyl Propionate, Anisic Aldehyde, Anisole, Benzaldehyde, Benzyl Acetate, Benzyl Acetone, Benzyl Alcohol, Benzyl Formate, Benzyl Iso Valerate, Benzyl Propionate, Beta Gamma Hexenol, Camphor Gum, laevo-Carveol, d-Carvone, laevo-Carvone, Cinnamic Alcohol, Cinnamyl Formate, cis-Jasmone, cis-3-Hexenyl Acetate, Curninic, alcohol, Cuminic aldehyde, Cyclal C, Dimethyl Benzyl Carbinol, Dimethyl Benzyl Carbinyl Acetate, Ethyl Acetate, Ethyl Aceto Acetate, Ethyl Amyl Ketone, Ethyl Benzoate, Ethyl Butyrate, Ethyl Hexyl Ketone, Ethyl Phenyl Acetate, Eucalyptol, Eugenol, Fenchyl Alcohol, Flor Acetate (tricyclo Decenyl Acetate), Frutene (tricyclo Decenyl Propionate), Geraniol, Hexenol, Hexenyl Acetate, Hexyl Acetate, Hexyl Formate, Hydratropic Alcohol, Hydroxycitronellal, Isoarnyl Alcohol, Isomenthone, Isopulegyl Acetate, Isoquinoline, cis jasmone, Ligustral, Linalool, Linalool Oxide, Linalyl Formate, Menthone, Methyl Acetophenone, Methyl Arnyl Ketone, Methyl Anthranilate, Methyl Benzoate, Methyl Benzyl Acetate, nerol, phenyl ethyl alcohol, alpha-terpineol, Propanoic acid ethyl ester, Ethyl Propionate, Acetic acid 2-methylpropyl ester, Isobutyl Acetate, Butanoic acid 2-methyl-ethyl ester, Ethyl-2-Methyl Butyrate, 2-Hexenal, (E)-, 2-Hexena,l Benzeneacetic acid methyl ester, Methyl Phenyl Acetate, 1,3-Dioxolane-2-acetic acid 2-methyl-ethyl ester, Fructone, Benzeneacetaldehyde.alpha.-methyl-, Hydratropic Aldehyde, Acetic acid (2-methylbutoxy)-2-propenyl ester, Allyl Amyl Glycolate, Ethanol 2,2'-oxybis-, Calone 161, 2(3H)-Furanone 5-ethyldihydro-, Gamma Hexalactone, 2H-Pyran 3,6-dihydro-4-methyl-2-(2-methyl-1-propenyl)-, Nerol Oxide, 2-Propenal 3-phenyl-, Cinnamic Aldehyde, 2-Propenoic acid 3-phenyl-methyl ester, Methyl Cinnamate, 4H-Pyran-4-one 2-ethyl-3-hydroxy-, Ethyl Maltol, 2-Heptanone, Methyl Amyl Ketone, Acetic acid pentyl ester, Iso Amyl-Acetate, Heptenone methyl-, Methyl Heptenone, 1-Heptanol, Heptyl Alcohol, 5-Hepten-2-one 6-methyl-, Methyl Heptenone, Ethanol 2-(2-methoxyethoxy)-, Veramoss Sps, Tricyclo[2.2.1.02,6]heptane 1-ethyl-3-methoxy-, Neoproxen, Benzene 1,4-dimethoxy-, Hydroquinone Dimethyl Ether, Carbonic acid 3-hexenyl methyl ester (Z)-, Liffarome, Oxirane 2,2-dimethyl-3-(3-methyl-2,4-pentadienyl)-, Myroxide, Ethanol 2-(2-ethoxyethoxy)-, Diethylene Glycol Mono Ethylether, Cyclohexaneethanol, Cyclohexyl Ethyl Alcohol, 3-Octen-1-ol (Z)-, Octenol Dix, 3-Cyclohexene-1-carboxaldehyde 3,6-dimethyl-, Cyclovertal, 1,3-Oxathiane 2-methyl-4-propyl-cis-, Oxane, Acetic acid 4-methylphenyl ester, Para Cresyl Acetate, Benzene (2,2-dimethoxyethyl)-, Phenyl Acetaldehyde Dimethyl Acetal, Octanal 7-methoxy-3,7-dimethyl-, Methoxycitronellal Pq, 2H-1-Benzopyran-2-one octahydro-, Octahydro Coumarin, Benzenepropanal.beta.-methyl-, Trifemal, 4,7-Methano-1H-indenecarboxaldehyde octahydro-, Formyltricyclodecan, Ethanone 1-(4-methoxyphenyl)-, Para Methoxy Acetophenone, Propanenitrile 3-(3-hexenyloxy)- (Z)-, Parmanyl, 1,4-Methanonaphthalen-5(1H)-one 4,4a,6,7,8,8a-hexahydro-, Tamisone, Benzene [2-(2-propenyloxy)ethyl]-, LRA 220, Benzenepropanol, Phenyl Propyl Alcohol, 1H-Indole, Indole, 1,3-Dioxolane 2-(phenylmethyl)-, Ethylene Glycol Acetal/Phenyl Acetaldehyde, 2H-1-Benzopyran-2-one 3,4-dihydro-, Dihydrocoumarin, and mixtures thereof.

Perfume raw materials having a B.P. of about 250° C. or higher and a C log P lower than 3.0 are called Quadrant II perfumes. Quadrant II perfumes having a B.P. higher than 250° C. and a C log P between 0 and 3.0 are preferred. Non-limiting examples of Quadrant II perfume raw materials include coumarin, eugenol, iso-eugenol, indole, methyl cinnamate, methyl dihydrojasmonate, methyl-N-methyl anthranilate, beta-methyl naphthyl ketone, delta-Nnonalactone, vanillin, and mixtures thereof.

Perfume raw materials having a B.P. less than 250° C. and a C log P higher than about 3.0 are called Quadrant III perfumes. Non-limiting examples of Quadrant III perfume raw materials include iso-bornyl acetate, carvacrol, alpha-citronellol, paracymene, dihydro myrcenol, geranyl acetate, d-limonene, linalyl acetate, vertenex.

Perfume raw materials having a B.P. of about 250° C. or higher and a C log P of about 3.0 or higher are called Quadrant IV perfumes or enduring perfumes. Non-limiting examples of enduring perfume raw materials include allyl cyclohexane propionate, ambrettolide, amyl benzoate, amyl cinnamate, amyl cinnamic aldehyde, amyl cinnamic aldehyde dimethyl acetal, iso-amyl salicylate, hydroxycitronellal-methyl anthranilate (known as Aurantiol®), benzophenone, benzyl salicylate, para-tert-butyl cyclohexyl acetate, iso-butyl quinoline, beta-caryophyllene, cadinene, cedrol, cedryl acetate, cedryl formate, cinnamyl cinnamate, cyclohexyl salicylate, cyclamen aldehyde, dihydro isojasmonate, diphenyl methane, diphenyl oxide, dodecalactone, 1-(1,2,3,4,5,6,7,8-octahydro-2,3,8,8-tetramethyl-2-naphthalenyl)-ethanone (known as iso E Super®), ethylene brassylate, methyl phenyl glycidate, ethyl undecylenate, 15-hydroxypentadecanoic acid lactone (known as Exaltolide®), 1,3,4,6,7,8-hexahydro-4,6,6,7,8,8-hexamethyl-cyclopenta-gamma-2-benzopyran (known as Galaxolide®), geranyl anthranilate, geranyl phenyl acetate, hexadecanolide, hexenyl salicylate, hexyl cinnamic aldehyde, hexyl salicylate, alpha-irone, gamma-ionone, gamma-n-methyl ionone, para-tertiary-butyl-alpha-methyl hydrocinnamic aldehyde (known as Lilial®), lilial (p-t-bucinal)®, linalyl benzoate, 2-methoxy naphthalene, methyl dihydrojasmone, musk indanone, musk ketone, musk tibetine, myristicin, oxahexadecanolide-10, oxahexadecanolide-11, patchouli alcohol, 5-acetyl-1,1,2,3,3,6-hexamethylindan (known as Phantolide®), phenyl ethyl benzoate, phenylethylphenylacetate, phenyl heptanol, phenyl hexanol, alpha-santalol, delta-undecalactone, gamma-undecalactone, vetiveryl acetate, yara-yara, ylangene.

The perfume raw materials and accords may be obtained from one or more of the following perfume material suppliers Firmenich (Geneva, Switzerland), Givaudan (Argenteuil, France), IFF (Hazlet, N.J.), Quest (Mount Olive, N.J.), Bedoukian (Danbury, Conn.), Sigma Aldrich (St. Louis, Mo.), Millennium Specialty Chemicals (Olympia Fields, Ill.), Polarone International (Jersey City, N.J.), Fragrance Resources (Keyport, N.J.), and Aroma & Flavor Specialties (Danbury, Conn.).

Traditionally, perfume accords are formulated around "enduring" perfumes (Quadrant IV) due to their high deposition efficiency hence odor impact on fabrics, while "non-enduring" perfumes, especially Quadrant I perfume ingredients, are considered difficult to deposit onto fabrics and as such typically are used solely in very low amount to minimize waste and pollution. Quadrant I perfume ingredients are hydrophilic (e.g., a C log P lower than 3.0) and have low boiling points (e.g., a B.P. lower than 250° C.); thus, they are easily lost to the wash or rinse medium or during heat drying. In compositions of the present disclosure, some non-enduring perfume ingredients, especially Quadrant I perfume ingredients, may be intentionally formulated, e.g., to improve the perfume odor in the headspace of the container to enable consumers to appreciate the perfume character of the contained water soluble pouches. As described below, compositions of the present disclosure may include at least about 2%, or at least about 3%, or at least about 4%, by weight of the composition, of Quadrant I perfume ingredients.

Perfume according to the present disclosure may contain from about 15% to about 60%, preferably from about 20% to about 55%, more preferably from about 25% to about 50% by weight of the perfume accord of non-enduring perfume ingredients. Non-enduring perfume ingredients encompass Quadrant I, II and III perfume ingredients. Perfume according to the present disclosure may contain from about 2% to about 15%, preferably from about 3% to about 12%, more preferably from about 4% to about 10% by weight of the perfume accord of Quadrant I perfume ingredients. The perfume may include at least about 2%, or at least about 3%, or at least about 4%, by weight of the composition, of Quadrant I perfume ingredients.

Additionally or alternatively, the perfume may include from about 2.5% to about 25%, preferably from about 3% to about 20%, more preferably from about 5% to about 15% of Quadrant II perfume ingredients, from about 10% to about 50%, preferably from about 15% to about 45%, more preferably from about 20% to about 40% of Quadrant III perfume ingredients, and/or from about 40% to about 85%, preferably from about 45% to about 75%, more preferably from about 40% to about 65% of Quadrant IV perfume ingredients. Such perfume accords have been found, when co-formulated with organic solvents into household care compositions enclosed in the water soluble film according to the present disclosure to form water soluble pouches according to the present disclosure, to deliver good perfume odor in the headspace of the container to enable consumers to appreciate the perfume character of the contained water soluble pouches, while still delivering efficient perfume on fabrics deposition through the wash hence great odor impact on fabrics at both wet and dry stage, and minimizing organic solvent loss upon storage.

A portion of the perfume may be encapsulated perfume. The perfume may be encapsulated in a core-shell encapsulate. An encapsulate may include a core and a wall, where the wall acts as a shell at least partially surrounding the core. The core may include a benefit agent, such as perfume. The wall may include an outer surface, which may include a coating. The coating may include an efficiency polymer. These elements are discussed in more detail below.

The composition may comprise from about 0.1%, or from about 0.2%, or from about 0.3%, or from about 0.4%, or from about 0.5%, to about 5%, or to about 2.5%, or to about 2%, or to about 1%, by weight of the composition, of encapsulates. The composition may include from about 0.1% to about 1%, by weight of the composition, of encapsulates.

The encapsulates may be friable. The encapsulates particle size can be measured by typical methods known in the art such as with a Malvern particle sizer. The encapsulates may have a mean particle size of from about 10 microns to about 500 microns, or to about 200 microns, or to about 100 microns, or to about 50 microns, or to about 30 microns. A plurality of encapsulates may form aggregates.

The encapsulates may have a cationic charge at a pH range from about 2 to about 10, from about 3 to about 9, or from about 4 to about 8.

The encapsulate may have a wall, which may at least partially surround the core. The wall may include a wall material selected from the group consisting of polyethylenes; polyamides; polystyrenes; polyisoprenes; polycarbonates; polyesters; polyacrylates; acrylics; aminoplasts; polyolefins; polysaccharides, such as alginate and/or chitosan; gelatin; shellac; epoxy resins; vinyl polymers; water insoluble inorganics; silicone; and mixtures thereof. The wall material may be selected from the group consisting of an aminoplast, an acrylic, an acrylate, and mixtures thereof.

The wall material may include an aminoplast. The aminoplast may include a polyurea, polyurethane, and/or polyureaurethane. The aminoplast may include an aminoplast copolymer, such as melamine-formaldehyde, urea-formaldehyde, cross-linked melamine formaldehyde, or mixtures thereof. The wall material may include melamine formaldehyde, and the wall may further include a coating as described below. The encapsulate may include a core that comprises perfume, and a wall that includes melamine formaldehyde and/or cross linked melamine formaldehyde. The encapsulate may include a core that comprises perfume, and a wall that comprises melamine formaldehyde and/or cross linked melamine formaldehyde, poly(acrylic acid) and poly(acrylic acid-co-butyl acrylate).

The outer wall of the encapsulate may include a coating. Certain coatings may improve deposition of the encapsulate onto a target surface, such as a fabric. The encapsulate may have a coating-to-wall weight ratio of from about 1:200 to about 1:2, or from about 1:100 to about 1:4, or even from about 1:80 to about 1:10.

The coating may comprise an efficiency polymer. The coating may comprise a cationic efficiency polymer. The cationic polymer may be selected from the group consisting of polysaccharides, cationically modified starch, cationically modified guar, polysiloxanes, poly diallyl dimethyl ammonium halides, copolymers of poly diallyl dimethyl ammonium chloride and vinyl pyrrolidone, acrylamides, imidazoles, imidazolinium halides, imidazolium halides, polyvinyl amines, polyvinyl formamides, pollyallyl amines, copolymers thereof, and mixtures thereof. The coating may comprise a polymer selected from the group consisting of polyvinyl amines, polyvinyl formamides, polyallyl amines, copolymers thereof, and mixtures thereof.

The coating may comprise polyvinyl formamide. The polyvinyl formamide may have a hydrolysis degree of from about 5% to about 95%, from about 7% to about 60%, or even from about 10% to about 40%.

One or more of the efficiency polymers may have an average molecular mass from about 1,000 Da to about 50,000,000 Da, from about 5,000 Da, to about 25,000,000 Da, from about 10,000 Da to about 10,000,000 Da, or even from about 340,000 Da to about 1,500,000 Da. One or more of the efficiency polymers may have a charge density from about 1 meq/g efficiency polymer to about 23 meq/g efficiency polymer, from about 1.2 meq/g efficiency polymer and 16 meq/g efficiency polymer, from about 2 meq/g efficiency polymer to about 10 meq/g efficiency polymer, or even from about 1 meq/g efficiency polymer to about 4 meq/g efficiency polymer.

The core of the encapsulate may include a benefit agent. Suitable benefit agents may include perfume raw materials, silicone oils, waxes, hydrocarbons, higher fatty acids, essential oils, lipids, skin coolants, vitamins, sunscreens, antioxidants, glycerine, catalysts, bleach particles, silicon dioxide particles, malodor reducing agents, odor-controlling materials, chelating agents, antistatic agents, softening agents, insect and moth repelling agents, colorants, antioxidants, chelants, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, glycerin, and natural actives, antibacterial actives, antiperspirant actives, cationic polymers, dyes and mixtures thereof. The benefit agent may include perfume raw materials.

The encapsulates may include a core that comprises perfume raw materials, and a wall that includes melamine formaldehyde and/or cross linked melamine formaldehyde, where the wall further comprises a coating on an outer surface of the wall, where the coating includes an efficiency polymer such as polyvinyl formamide.

Suitable encapsulates may be obtained from Encapsys (Appleton, Wis., USA). The detergent compositions may include mixtures of different encapsulates, for example encapsulates having different wall materials and/or benefit agents.

The present household care compositions may further include formaldehyde scavengers. Such scavengers may be useful in or with certain encapsulates, particularly encapsulates that include and/or release formaldehyde. Suitable formaldehyde scavengers may include: sodium bisulfite, urea, cysteine, cysteamine, lysine, glycine, serine, carnosine, histidine, glutathione, 3,4-diaminobenzoic acid, allantoin, glycouril, anthranilic acid, methyl anthranilate, methyl 4-aminobenzoate, ethyl acetoacetate, acetoacetamide, malonamide, ascorbic acid, 1,3-dihydroxyacetone dimer, biuret, oxamide, benzoguanamine, pyroglutamic acid, pyrogallol, methyl gallate, ethyl gallate, propyl gallate, triethanol amine, succinamide, thiabendazole, benzotriazol, triazole, indoline, sulfanilic acid, oxamide, sorbitol, glucose, cellulose, poly(vinyl alcohol), poly(vinyl amine), hexane diol, ethylenediamine-N,N'-bisacetoacetamide, N-(2-ethylhexyl) acetoacetamide, N-(3-phenylpropyl)acetoacetamide, lilial, helional, melonal, triplal, 5,5-dimethyl-1,3-cyclohexanedione, 2,4-dimethyl-3-cyclohexenecarboxaldehyde, 2,2-dimethyl-1,3-dioxan-4,6-dione, 2-pentanone, dibutyl amine, triethylenetetramine, benzylamine, hydroxycitronellol, cyclohexanone, 2-butanone, pentane dione, dehydroacetic acid, chitosan, or mixtures thereof.

Organic Solvent

The household care compositions of the present disclosure may include organic solvent. Organic solvents may be useful in the household compositions of the present disclosure, for example, to facilitate product stability. However, the loss of organic solvents from the pouches described herein can cause problems such as product instability, sticky or greasy pouches, etc. It is believed that the water-soluble films of the present disclosure operate with the compositions and containers of the present disclosure to minimize the loss of organic solvents while providing other pouch benefits, such as pouch integrity, film plasticity, in-use dissolution, and/or perfume release.

The compositions may include from about 1% to about 50%, by weight of the composition, of organic solvent. The compositions may include from about 5% or from about 10%, or from about 15%, to about 50%, or to about 40%, or to about 30% by weight of the composition, of organic solvent.

Suitable organic solvents include and are preferably selected from low molecular weight mono-alcohols, polyols, glycols, or combinations thereof. As used herein, "low molecular weight" means having a molecular weight of less than about 600, or less than about 500, or less than about 400, or less than about 300, or less than about 200. Suitable organic solvents may include glycerol, 1,2-propanediol, 1,3-propanediol, dipropylene glycol, diethylene glycol, polyalkylene glycol (such as polyethylene glycols, which may have a weight average molecular weight of from about 200 to about 600, or to about 500, or to about 400), sorbitol, and mixtures thereof. The household care composition may be substantially free of ethanol, meaning that the composition comprises from 0% (including 0%) to about 0.1% ethanol by weight of the composition. As used herein, neither fatty acids nor alkanolamines (e.g., monoethanolamine, diethanolamine, triethanolamine) nor hydrotropes such as cumene sulphonate, toluene sulphonate or xylene sulphonate are understood to be organic solvents. Water is also not understood as an organic solvent within the scope of this invention.

The household care composition may comprise at least two organic solvents, or at least three organic solvents. The composition may include a first organic solvent. The first organic solvent may be present in a greater proportion than other organic solvents. The first organic solvent may be 1,2-propanediol. The household care composition may include a second organic solvent. The second organic solvent may be glycerol. The ratio of first solvent, e.g. 1,2-propanediol, to second solvent, e.g. glycerol, may be from about 7:1 to about 1:5, or from about 6.5:1 to about 1:3, or from about 4:1 to about 1:1, or from 3.5:1 to 1.5:1.

The household care composition may include 1,2-propanediol and dipropylene glycol. The weight ratio of 1,2-propanediol to dipropylene glycol may be between 1:1 and 10:1, or between 1:1 and 5:1, or between 1.5:1 and 4:1.

The household care composition may include 1,2-propanediol, glyerol and dipropylene glycol. The weight ratio of 1,2-propanediol to glycerol and from 1,2-propanediol to dipropylene glycol may be between 1:1 and 10:1, or between 1:1 and 5:1, or between 1.5:1 and 4:1. The weight ratio of glycerol to dipropylene glycol may be between 3:1 and 1:3, or between 2:1 and 1:2, or between 1.5:1 and 1:1.5.

In some aspects, at least one, or at least two, of the organic solvents of the organic solvents are the same as at least one, or at least two of the plasticizers of the film material. Without wishing to be bound by theory, it is believed that having a common solvent/plasticizer can improve plasticity of the film over time when it is in contact with the composition contained in the compartment. Having a common solvent/plasticizer may also facilitate selective leakage of certain perfume into the headspace of a container. The common solvent/plasticizer may be selected from glycerol, sorbitol, dipropylene glycol, 1,2-propanediol, 1,3-propanediol, or combinations thereof.

The organic solvents of the present compositions may be characterized by a c Log P value, as described above, which gives an indication of relative hydrophilicity. The c Log P values of several organic solvents are provided below in Table 1.

The organic solvents of the present composition may be characterized by their boiling points (B.P.). The boiling points of several organic solvents are provided below in Table 1.

TABLE 1

| Solvent | cLog P | Approx. B.P. |
|---|---|---|
| PEG 200 (polyethylene glycol of MW = 200) | −1.47 | >250° C. |
| PEG 300 | −1.22 | >250° C. |
| PEG 400 | −0.7 | >250° C. |
| PEG 600 | −0.74 | >250° C. |
| DPG (dipropylene glycol) | −0.6 | 231° C. |
| 1,2-Propanediol | −1.1 | 188° C. |
| 1,3-Propanediol | −1.09 | 211-217° C. |
| Glycerol | −1.94 | 290° C. |
| Sorbitol | −2.54 | 290-295° C. |

It may be desirable to select particular combinations of perfumes and organic solvent so that at least some perfumes may leak from the pouches described into the headspace of a closed container, while loss of organic solvent is relatively minimized.

In the household care compositions described herein, the organic solvent may contain at least about 10%, or at least about 20%, by weight of the total organic solvent, of an organic solvent having a boiling point above 250° C., and/or the perfume may contain at least about 10%, or at least about 20%, or at least about 30% by weight of the total perfume, of perfume raw materials having a boiling point below 250° C.

In the household care compositions described herein, the organic solvent may contain at least about 50%, or at least about 80%, or at least about 90% or even at least about 95% by weight of the total organic solvent, of an organic solvent having a c Log P value below zero, and/or the perfume may contain at least about 50%, or at least about 80%, or at least about 90% or even at least about 95% by weight of the total perfume, of perfume raw materials having a having a c Log P value above zero. More preferably the perfume accord will comprise between about 4% and about 40%, preferably between 6% and 30%, more preferably between 8% and 20% by weight of the perfume of perfume raw materials with a C log P between 0 and 3.0, and between 60% and 96%, preferably between 70% and 94%, more preferably between 80% and 92% by weight of the perfume of perfume raw materials with a C log P above 3.0.

Other Ingredients

The household care compositions described herein may comprise one or more of the following non-limiting list of ingredients: fabric care benefit agent; detersive enzyme; deposition aid; rheology modifier; builder; bleach; bleaching agent; bleach precursor; bleach booster; bleach catalyst; perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors; cationic starches; scum dispersants; substantive dyes;

hueing dyes; colorants; opacifier; antioxidant; hydrotropes such as toluenesulfonates, cumenesulfonates and naphthalenesulfonates; color speckles; colored beads, spheres or extrudates; clay softening agents; anti-bacterial agents. Additionally or alternatively, the compositions may comprise surfactants, quaternary ammonium compounds, and/or solvent systems. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

The household care compositions described herein may include from about 5% to about 70%, or from about 10% to about 60%, or from about 20% to about 50%, or from about 30% about 50%, by weight of the composition, of surfactant, which may be selected from anionic, nonionic, cationic, zwitterionic, or amphoteric surfactants, or mixtures thereof. Anionic surfactants may include alkyl benzene sulphonates, alkoxylated alkyl sulfates, or combinations thereof. Nonionic surfactants may include ethoxylated nonionic surfactants. The composition may comprise from 5 to 60% or from about 15 to about 50%, or from about 20 to about 45% surfactant. The surfactant may comprise anionic surfactant and nonionic surfactant in a weight ratio of from about 20:1 to about 1:3, or from about 15:1 to about 1:2, or from about 12:1 to about 3:1, wherein the anionic surfactant is comprised of one or more of fatty acids, alkyl ether sulphates, alkylbenzene sulfonates or combinations thereof.

The household care compositions described herein may include water, if any, at relatively low levels. The household care composition may comprise less than 20%, or less than 15%, or less than 12%, or less than 10%, or less than 8%, or less than 5% water. The composition may comprise from about 1% to 20%, or from about 3% to about 15%, or from about 5% to about 12%, by weight of the composition, water. The composition may be substantially anhydrous, meaning herein that it may contain less than about 5%, or less than about 2%, or less than about 1% of water. Relatively high levels of water may adversely affect the integrity of the water-soluble film.

The composition may comprise a mix of water and glycols, where the glycol may be selected from the group comprising glycerol, 1,2, propane diol, 1.3, propane diol and dipropylene glycol. The glycerol may be present in an amount less than about 15%, preferably less than about 10%, of the total composition by weight. The total combined amount of water and glycerol may be from about 3% to about 20%, preferably from about 5% to about 15%, by weight of the composition.

Methods of Use

The container systems described herein may be suitable for storing, transporting, and/or selling the pouches contained therein.

Any of the pouches described herein, as well as the household compositions contained therein, may be used to treat a substrate, e.g., fabric or a hard surface, for example by contacting the substrate with the film, article, and/or composition contained therein. The contacting step may occur manually or in an automatic machine, e.g., an automatic (top or front-loading) laundry machine or an automatic dishwashing machine. The contacting step may occur in the presence of water, which may be at a temperature up to about 80° C., or up to about 60° C., or up to about 40° C., or up to about 30° C., or up to about 20° C., or up to about 15° C., or up to about 10° C., or up to about 5° C. The contacting step may be followed by a multi-rinse cycle or even by a single rinse cycle. The method may include a step of opening a closed container and accessing a pouch contained therein. The method may further include the step of closing the container.

A method of treating a substrate, such as a fabric, may include the steps of: opening a closed container; accessing a pouch contained in an interior space of the container, wherein the pouch comprises a water-soluble film and a household care composition at least partially enclosed in a compartment by the water-soluble film, the household care composition comprising from about 0.1% to about 10%, by weight of the household care composition, of perfume, and from about 1% to about 50%, by weight of the household care composition, of an organic solvent; the film comprising a polyvinyl alcohol (PVOH) resin blend, the PVOH resin blend comprising a first PVOH polymer that comprises a first anionic monomeric unit, a vinyl alcohol monomer unit, and optionally a vinyl acetate unit, the PVOH resin blend further comprising a second PVOH polymer selected from the group consisting of: a) a PVOH polymer that comprises a second anionic monomeric unit, a vinyl alcohol monomer unit, and optionally a vinyl acetate unit, or b) a PVOH homopolymer consisting essentially of a vinyl alcohol monomer unit and optionally a vinyl acetate unit; combining the pouch with water so that at least a portion of the water-soluble film dissolves, thereby releasing at least a portion of the household care composition; and contacting a substrate to be treated with the household care composition.

The present disclosure further relates to a use of a water-soluble film to provide a pleasant scent experience upon opening a container, where the water-soluble film forms a pouch and at least partially encloses in a compartment a household care composition that comprises perfume and organic solvent, and where the water-soluble film comprises a polyvinyl alcohol (PVOH) resin blend, the PVOH resin blend comprising a first PVOH polymer that comprises a first anionic monomeric unit, a vinyl alcohol monomer unit, and optionally a vinyl acetate unit, the PVOH resin blend further comprising a second PVOH polymer selected from the group consisting of: a) a PVOH polymer that comprises a second anionic monomeric unit, a vinyl alcohol monomer unit, and optionally a vinyl acetate unit, or b) a PVOH homopolymer consisting essentially of a vinyl alcohol monomer unit and optionally a vinyl acetate unit.

EXAMPLES, PART 1

Specifically contemplated examples of the disclosure are herein described in the following numbered paragraphs. These examples are intended to be illustrative in nature and not intended to be limiting.

1. A container system comprising: a closeable container having walls that define an interior space; at least one pouch in the interior space, the pouch comprising a water-soluble film and a household care composition at least partially enclosed in a compartment by the water-soluble film, the household care composition comprising from about 0.1% to about 10%, by weight of the household care composition, of perfume, and from about 1% to about 50%, by weight of the household care composition, of an organic solvent; the film comprising a polyvinyl alcohol (PVOH) resin blend, the PVOH resin blend comprising a first PVOH polymer that comprises a first anionic monomeric unit, a vinyl alcohol monomer unit, and optionally a vinyl acetate unit, the PVOH resin blend further comprising a second PVOH polymer selected from the group consisting of: a) a PVOH polymer that comprises a second anionic monomeric unit, a vinyl alcohol monomer unit, and optionally a vinyl acetate unit, or b) a PVOH homopolymer consisting essentially of a vinyl alcohol monomer unit and optionally a vinyl acetate unit.

2. A container system according to paragraph 1, wherein the first anionic monomeric unit is derived from a member selected from the group consisting of vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, salts of the foregoing, preferably alkali metal salts of the foregoing, esters of the foregoing, and combinations thereof.

3. A container system according to any of paragraphs 1-2, wherein the first anionic monomeric unit is derived from a carboxylated anionic monomeric unit.

4. A container system according to any of paragraphs 1-3, wherein the first anionic monomeric unit is derived from a member selected from the group consisting of maleic acid, monoalkyl maleate, dialkyl maleate, maleic anyhydride, and combinations thereof.

5. A container system according any of paragraphs 1-4, wherein the first anionic monomer unit is derived from a monoalkyl maleate selected from the group consisting of monomethyl maleate, salts thereof, and combinations thereof.

6. A container system according to any of paragraphs 1-5, wherein the first anionic monomer unit is present in the first PVOH polymer in an amount in a range of about 1.0 mol. % to about 5.0 mol. %, preferably from about 2 mol. % to about 4 mol. %, of the first PVOH polymer.

7. A container system according to any of paragraphs 1-6, wherein the first anionic monomer unit is present in the film in an amount in a range of about 0.5 mol. % to about 5 mol. % of total PVOH polymers in the film.

8. A container system according to any of paragraphs 1-7, wherein the first PVOH polymer is present in an amount in a range from about 10 wt. % to about 90 wt. % of total PVOH polymers in the film.

9. A container system according to any of paragraphs 1-8, wherein the second PVOH polymer comprises a second anionic monomeric unit.

10. A container system according to any of paragraphs 1-9, wherein the second anionic monomeric unit is different than the first anionic monomeric unit.

11. A container system according to any of paragraphs 9-11, wherein the second anionic monomeric unit is derived from a member selected from the group consisting of vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anyhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, salts of the foregoing, preferably alkali metal salts of the foregoing, esters of the foregoing, and combinations thereof.

12. A container system according to any of paragraphs 9-11, wherein the second anionic monomeric unit is derived from a sulfonated anionic monomeric unit, preferably derived from a member selected from the group consisting of acrylamido methylpropanesulfonic acids, salts thereof, and combinations thereof.

13. A container system according to any of paragraphs 9-12, wherein the first PVOH polymer is present in the PVOH blend in a range of from about 50 wt. % to about 90 wt. %, by weight of the total PVOH polymers in the blend, wherein the first anionic monomeric unit is derived from a member selected from the group consisting of monomethyl maleate, alkali metal salts thereof, and combinations thereof, wherein the second PVOH polymer is present in the PVOH blend in a range of from about 10 wt. % to about 50 wt. %, by weight of the total PVOH polymers in the blend, and wherein the second monomeric unit is derived from a member selected from the group consisting of acrylamido methylpropanesulfonic acids, alkali metal salts thereof, and combinations thereof.

14. A container system according to any of paragraphs 9-13, the first PVOH polymer having a first level of incorporation ($a_1$) of the first anionic monomer unit; and the second PVOH polymer having a second level of incorporation ($a_2$) of the second anionic monomer unit, wherein if the first and the second anionic monomer are the same, then the absolute value of $|a_1-a_2|$ is greater than zero.

15. A container system according to any of paragraphs 9-14, wherein $a_1$ is in a range of about 1 mol. % to about 5 mol. %, preferably from about 1 mol. % to about 3 mol. % of the first PVOH polymer, $a_2$ is in a range of about 1 mol. % to about 5 mol. %, preferably from about 1 mol. % to about 3 mol. % of the second PVOH polymer, and $|a_1-a_2|$, preferably $a_1-a_2$, is in a range of about 0 mol. % to about 3 mol. %, or from about 1 mol. % to about 3 mol. %.

16. A container system according to any of paragraphs 9-15, wherein the second anionic monomer unit is present in the second PVOH polymer in an amount in a range of about 1.0 mol. % to about 5.0 mol. % of the second PVOH polymer.

17. A container system according to any of paragraphs 9-16, wherein the second anionic monomer unit is present in the film in an amount in a range of about 0.2 mol. % to about 4.5 mol. % of total PVOH polymers in the film.

18. A container system according to any of paragraphs 9-17, wherein the first anionic monomer unit and the second anionic monomer unit are together present in a combined amount in a range of about 2.0 mol. % to about 3.5 mol. % of total PVOH polymers in the film.

19. A container system according any of paragraphs 9-18, wherein the second PVOH polymer is present in an amount in a range of about 10 wt. % to about 90 wt. % of total PVOH polymers in the film.

20. A container system according any of paragraphs 1-8, wherein the second PVOH polymer is a PVOH homopolymer.

21. A container system according any of paragraphs 1-8 and/or 20, wherein the first PVOH polymer is present in the PVOH blend in a range of from about 20 wt. % to about 65 wt. %, preferably from about 20 wt. % to about 60 wt. %, more preferably from about 30 wt. % to about 40 wt. %, by weight of the total PVOH polymers in the blend, wherein the first anionic monomeric unit of the first PVOH polymer is derived from a member selected from the group consisting of monomethyl maleate, alkali metal salts thereof, and combinations thereof, and wherein the PVOH homopolymer is characterized by a 4% solution viscosity at 20° C. ($\mu_2$) from about 10 cP to about 30 cP and is present in the PVOH resin blend in a range of from about 40 wt. % to about 80 wt. %, preferably from about 60 wt. % to about 70 wt. %, by weight of the total PVOH polymers in the blend.

22. A container system according any of paragraphs 1-21, wherein the second PVOH polymer is characterized by a 4% solution viscosity at 20° C. ($\mu_2$) from about 10 cP to about 40 cP, or from about 10 cP to about 30 cP, or from about 12 cP to about 25 cP.

23. A container system according any of paragraphs 1-23, wherein the second PVOH polymer is characterized by a degree of hydrolysis of from about 60% to about 99%, preferably from about 80% to about 98%, preferably from about 85% to about 95%, preferably from about 87% to about 92%.

24. A container system according any of paragraphs 1-23, wherein the first PVOH polymer is characterized by a first 4% solution viscosity at 20° C. ($\mu_1$), wherein the second PVOH polymer is characterized by a second 4% solution viscosity at 20° C. ($\mu_2$), and wherein an absolute viscosity difference $|\mu_2-\mu_1|$ for the first PVOH polymer and the second PVOH polymer is in a range of 0 cP to about 10 cP.

25. A container system according any of paragraphs 1-25, wherein the PVOH resin blend is present in the water-soluble film in an amount in a range of about 30 wt. % to about 95 wt. %, by weight of the film.

26. A container system according any of paragraphs 1-25, wherein the water-soluble film has at least one, or at least two, or all three, of the following characteristics: a) a residue value of about 48 wt. % or less as measured by the Dissolution Chamber Test; b) an average tensile strength value of at least about 33 MPa as measured by the Tensile Strength Test; and/or c) a modulus value of at least about 12 N/mm² as measured by the Modulus Test.

27. A container system according to any of paragraphs 1-26, wherein the water-soluble film further comprises at least a third water-soluble polymer, preferably which is a polymer other than a PVOH polymer.

28. A container system according to paragraph 27, wherein the third water-soluble polymer is selected from the group consisting of polyethyleneimines, polyvinyl pyrrolidones, polyalkylene oxides, polyacrylamides, cellulose ethers, cellulose esters, cellulose amides, polyvinyl acetates, polyamides, gelatines, methylcelluloses, carboxymethyl-celluloses and salts thereof, dextrins, ethylcelluloses, hydroxyethyl celluloses, hydroxypropyl methylcellulo-ses, maltodextrins, starches, modified starches, guar gum, gum Acacia, xanthan gum, carrageenan, polyacrylates and salts thereof, copolymers thereof, blends thereof, and combinations thereof.

29. A container system according to any of paragraphs 1-28, wherein the water-soluble film further comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, surfactants, and combinations thereof.

30. A container system according to any of paragraphs 1-29, wherein the water-soluble film further comprises one or more plasticizers in an amount in a range of about 1wt. % to about 40 wt. % of the film.

31. A container system according to any of paragraphs 1-30, wherein the pouch comprises at least two compartments, or at least three compartments.

32. A container system according to any of paragraphs 1-31, wherein the perfume comprises from about 15% to about 60%, by weight of the perfume, of non-enduring perfume ingredients selected from Quadrant I perfume ingredients, Quadrant II perfume ingredients, Quadrant III perfume ingredients, and combinations thereof.

33. A container system according to any of paragraphs 1-32, wherein the perfume comprises from about 2% to about 15%, by weight of the perfume, of Quadrant I perfume ingredients.

34. A container system according to any of paragraphs 1-33, wherein the perfume comprises: a) from about 2% to about 15%, preferably from about 3% to about 12%, more preferably from about 4% to about 10% by weight of the perfume accord of Quadrant I perfume ingredients; b) from about 2.5% to about 25%, preferably from about 3% to about 20%, more preferably from about 5% to about 15% of Quadrant II perfume ingredients; c) from about 10% to about 50%, preferably from about 15% to about 45%, more preferably from about 20% to about 40% of Quadrant III perfume ingredients; and/or d) from about 40% to about 85%, preferably from about 45% to about 75%, more preferably from about 40% to about 65% of Quadrant IV perfume ingredients.

35. A container system according to any of paragraphs 1-34, wherein a portion of the perfume is encapsulated in a core-shell encapsulate.

36. A container system according to any of paragraphs 1-35, wherein the organic solvent is selected from the group consisting of mono-alcohols, polyols, glycols, and combinations thereof.

37. A container system according to paragraphs 1-36, wherein the organic solvent is selected from the group consisting of glycerol, 1,2-propanediol, 1,3-propanediol, dipropylene glycol, diethylene glycol, polyalkylene glycol, sorbitol, and mixtures thereof.

38. A container system according to any of paragraphs 1-37, wherein the organic solvent comprises at least about 10%, or at least about 20%, by weight of the total organic solvent, of an organic solvent having a boiling point above 250° C., and wherein the perfume comprises at least about 10%, or at least about 20%, or at least about 30%, by weight of the total perfume, of perfume raw materials having a boiling point below 250° C.

39. A container system according to any of paragraphs 1-38, wherein the organic solvent comprises at least about 50%, or at least about 80%, or at least about 90%, or even at least about 95%, by weight of the total organic solvent, of an organic solvent having a c Log P value below zero, and wherein the perfume comprises at least about 50%, or at least about 80%, or at least about 90%, or even at least about 95%, by weight of the total perfume, of perfume raw materials having a having a c Log P value above zero.

40. A container system according to any of paragraphs 1-39, wherein the film further comprises at least one plasticizer, and wherein at least one of the organic solvents is the same as the plasticizer ("common solvent/plasticizer"), preferably wherein the common solvent/plasticizer is selected from glycerol, sorbitol, dipropylene glycol, 1,2-propanediol, 1,3-propanediol, and combinations thereof.

41. A container system according to any of paragraphs 1-40, wherein the household care composition comprises from about 5% to about 70%, by weight of the composition, of surfactant.

42. A container system according to any of paragraphs 1-41, wherein the household care composition is a fabric care composition.

43. A container system according to any of paragraphs 1-42, wherein the closeable container is recloseable.

44. A container system according to any of paragraphs 1-43, wherein the closeable container is selected from a flexible bag and a rigid tub.

45. A method of treating a substrate, such as a fabric, comprising the steps of: opening a closed container; accessing a pouch contained in an interior space of the container, wherein the pouch is according to any of paragraphs 1-44, preferably wherein the pouch comprises a water-soluble film and a household care composition at least partially enclosed in a compartment by the water-soluble film, the household care composition comprising from about 0.1% to about 10%, by weight of the household care composition, of perfume, and from about 1% to about 50%, by weight of the household care composition, of an organic solvent; the film comprising a polyvinyl alcohol (PVOH) resin blend, the PVOH resin blend comprising a first PVOH polymer that comprises a first anionic monomeric unit, a vinyl alcohol monomer unit, and optionally a vinyl acetate unit, the PVOH resin blend further comprising a second PVOH polymer selected from the group consisting of: a) a PVOH polymer that comprises a second anionic monomeric unit, a vinyl alcohol monomer unit, and optionally a vinyl acetate unit, or b) a PVOH homopolymer consisting essentially of a vinyl alcohol monomer unit and optionally a vinyl acetate unit; combining the pouch with water so that at least a portion of the water-soluble film dissolves, thereby releasing at least a portion of the household care composition; contacting a substrate to be treated with the household care composition.

46. A use of a water-soluble film to provide a pleasant scent experience upon opening a container, where the water-soluble film forms a pouch according to any of paragraphs 1-44, preferably wherein the film forms a pouch and at least partially encloses in a compartment a household care composition that comprises perfume and organic solvent, and where the water-soluble film comprises a polyvinyl alcohol (PVOH) resin blend, the PVOH resin blend comprising a first PVOH polymer that comprises a first anionic monomeric unit, a vinyl alcohol monomer unit, and optionally a vinyl acetate unit, the PVOH resin blend further comprising a second PVOH polymer selected from the group consisting of: a) a PVOH polymer that comprises a second anionic monomeric unit, a vinyl alcohol monomer unit, and optionally a vinyl acetate unit, or b) a PVOH homopolymer consisting essentially of a vinyl alcohol monomer unit and optionally a vinyl acetate unit.

Test Methods

The following test methods are to be used to determine some of the particular characteristics described herein.

Dissolution Chamber Residue Test

A water-soluble film characterized by or to be tested for undissolved residue according to the Dissolution Chamber (DC) Test is analyzed as follows using the following materials:

1. Beaker (4000 ml);
2. Stainless steel washers (3.5" (88.9 mm) OD, 1.875" ID (47.6 mm), 0.125" (3.18 mm) thick);
3. Styrene-butadiene rubber gaskets (3.375" (85.7 mm) OD, 1.91" ID (48.5 mm), 0.125" thick (3.18 mm));
4. Stainless steel screens (3.0" (76.2 mm) OD, 200×200 mesh, 0.0021" (0.053 mm) wire OD, 304 SS stainless steel wire cloth);
5. Thermometer (0° C. to 100° C., accurate to +/−1° C.);
6. Cutting punch (1.5" (38.1 mm) diameter);
7. Timer (accurate to the nearest second);
8. Reverse osmosis (RO) water;
9. Binder clips (size #5 or equivalent);
10. Aluminum pans (2.0" (50.8 mm) OD); and
11. Sonicator.

For each film to be tested, three test specimens are cut from a selected test film having a thickness of 3.0±0.10 mil (or 76.2±2.5 µm) using the cutting punch. If cut from a film web, the specimens should be cut from areas of web evenly spaced along the transverse direction of the web. Each test specimens is then analyzed using the following procedure:

1. Weigh the film specimen and track the specimen through the test. Record the initial film weight ($F_o$).
2. Weigh a set of two sonicated, clean, and dry screens for each specimen and track them through the test. Record the initial screen weights (collectively $S_o$ for the two screens combined).
3. Assemble a specimen dissolution chamber by flatly sandwiching the film specimen between the center of the two screens, followed by the two rubber gaskets (one gasket on each side between the screen and washer), and then the two washers.
4. Secure the dissolution chamber assembly with four binder clips evenly spaced around the washers and the clips folded back.
5. Fill the beaker with 1,500 ml of reverse osmosis water at laboratory room temperature (72+/−3° F., 22+/−2° C.) and record the room temperature.
6. Set the timer to a prescribed immersion time of 5 minutes.
7. Place the dissolution chamber assembly into the beaker and immediately start the timer, inserting the dissolution chamber assembly at an approximate 45 degree entry angle into the water surface. This entry angle helps remove air bubbles from the chamber. The dissolution chamber assembly rests on the beaker bottom such that the test specimen film is positioned horizontally about 10 mm from the bottom. The four folded-back binder clips of the dissolution chamber assembly are suitable to maintain the about 10 mm film clearance from the beaker bottom, however, any other equivalent support means may be used.
8. At the prescribed elapsed prescribed immersion time of 5 minutes, slowly remove the dissolution chamber assembly from the beaker at an approximate 45 degree angle.
9. Hold the dissolution chamber assembly horizontally over the aluminum pan to catch any drips from the screens and carefully remove the binder clips, washers, and gaskets. Do not break open the sandwiched screens.
10. Place the sandwiched screens (i.e., screen/residual undissolved film/screen) over the aluminum pan and into an oven at 100° C. for 30 minutes to dry.
11. Weigh the dried set of sandwiched screens including any residual undissolved film therein. Measure and add to this dried screen weight any dried film drippings captured in and recovered from (e.g., by scraping) the pan when the dissolution chamber assembly was first removed from the beaker and during drying. Record the final sandwiched screen weight (collectively $S_f$, including the dried film drippings).

12. Calculate % residue ("DC residue") left for the film specimen: % DC residue=$100*((S_f-S_o)/F_o)$.

13. Clean the sandwiched screens by soaking them in a beaker of RO water for about 20 minutes. Then, take them apart and do a final rinse in the sonicator (turned on and filled with RO water) for at least 5 minutes or until no residue is visible on the screens.

Suitable behavior of water-soluble films according to the disclosure is marked by DC residue values of about 45 wt. % or less or about 48 wt. % or less as measured by the DC Test. The water-soluble film may have a DC value of at least 1, 2, 5, 10, or 20 wt. % and/or up to about 15, 20, 30, 40, 45 wt. %, or 48 wt. % (e.g., about 5 wt. % to about 48 wt. %, about 10 wt. % to about 45 wt. %, about 20 wt. % to about 45 wt. %, or about 30 wt. % to about 40 wt. %).

Tensile Strength Test and Modulus Test

A water-soluble film characterized by or to be tested for tensile strength according to the Tensile Strength (TS) Test and modulus (or tensile stress) according to the Modulus (MOD) Test is analyzed as follows. The procedure includes the determination of tensile strength and the determination of modulus at 100% elongation according to ASTM D 882 ("Standard Test Method for Tensile Properties of Thin Plastic Sheeting") or equivalent. An INSTRON tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For tensile strength or modulus determination, 1"-wide (2.54 cm) samples of a single film sheet having a thickness of 3.0±0.15 mil (or 76.2±3.8 μm) are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine, elongated, and analyzed to determine the 100% modulus (i.e., stress required to achieve 100% film elongation) and tensile strength (i.e., stress required to break film).

Optionally, the films can be characterized by particular mechanical properties which make the films suitable for processing into articles, e.g. filmed packets.

The water-soluble films according to the disclosure can be marked by TS values of at least about 24 MPa or about 28 MPa as measured by the TS Test. Generally, higher TS values are desirable because they correspond to stronger pouch seals when the film is the limiting or weakest element of a seal. The water-soluble film may have a TS value of at least about 24, 26, 28, 30, 33, or 35 MPa and/or up to about 32, 34, 40, 45, or 50 MPa (e.g., about 24 MPa to about 36 MPa or about 28 MPa to about 32 MPa). Alternatively or additionally, an upper bound for a suitable TS value range can be a TS value for a corresponding water-soluble film having only a single PVOH polymer or PVOH copolymer of the PVOH polymers and PVOH copolymers in the PVOH resin blend (e.g., a corresponding single-resin film having the higher TS value).

The water-soluble films according to the disclosure can be marked by MOD values of at least about 11 N/mm$^2$ or about 12 N/mm$^2$ as measured by the MOD Test. Generally, higher MOD values are desirable because they correspond to pouches having a greater stiffness and a lower likelihood of deforming and sticking to each other when loaded on top of each other during production or in final consumer packaging. The water-soluble film may have a MOD value of at least about 11, 12, or 13 N/mm$^2$ and/or up to about 13, 14, 15, or 16 N/mm$^2$ (e.g., about 11 N/mm$^2$ to about 15 N/mm$^2$ or about 12 N/mm$^2$ to about 14 N/mm$^2$). Alternatively or additionally, an upper bound for a suitable MOD value range can be a MOD value for a corresponding water-soluble film having only a single PVOH polymer or PVOH copolymer of the PVOH polymers and PVOH copolymers in the PVOH resin blend (e.g., a corresponding single-resin film having the higher MOD value).

EXAMPLES, PART 2

The following examples are intended to be illustrative in nature and non-limiting.

Example 1

Sample Resin Blends, and Films and Pouches Made Therefrom

Table 2 lists several exemplary PVOH polymer resins (A-J) that may be used to make PVOH films.

TABLE 2

| Polymer | Description |
|---|---|
| A | Anionic PVOH copolymer with monomethylmaleate* monomer unit (2% substitution) |
| B | Anionic PVOH copolymer with monomethylmaleate* monomer unit (4% substitution) |
| C | Anionic PVOH copolymer with co-AMPS** monomer unit (1% substitution) |
| D | Anionic PVOH copolymer with co-AMPS** monomer unit (2% substitution) |
| E | Anionic PVOH copolymer with co-AMPS** monomer unit (4% substitution) |
| F | PVOH homopolymer (88% degree of hydrolysis; 13 cps) |
| G | PVOH homopolymer (88% degree of hydrolysis; 18 cps) |
| H | PVOH homopolymer (88% degree of hydrolysis; 23 cps) |
| I | PVOH homopolymer (86% degree of hydrolysis; 20 cps) |
| J | PVOH homopolymer (92% degree of hydrolysis; 20 cps) |

*sodium salt
**acrylamido methylpropanesulfonic acid (sodium salt) comonomer

Table 3 shows various PVOH polymer blends (#1-12) that can be made from the polymers listed of Table 1. The blends are listed by the relative weight % of each polymer in each PVOH blend. The PVOH resin blends can be used in combination with other film adjuncts (e.g., plasticizers, etc.) to make water-soluble films. Such films can be used to form a pouch that contains a household care composition, such as a laundry detergent.

TABLE 3

| PVOH Blend | Polymer (by wt % in PVOH blend) | | | | | | | | | |
| --- | --- | --- | --- | --- | --- | --- | --- | --- | --- | --- |
| | Anionic PVOH copolymers | | | | | PVOH homopolymers | | | | |
| | A | B | C | D | E | F | G | H | I | J |
| 1 | | 70 | | 30 | | | | | | |
| 2 | | 60 | | | 40 | | | | | |
| 3 | 80 | | | 20 | | | | | | |
| 4 | | 50 | 50 | | | | | | | |
| 5 | 70 | | 30 | | | | | | | |
| 6 | 60 | | | | 40 | | | | | |
| 7 | | 30 | | | | | 70 | | | |
| 8 | | 40 | | | | | | 60 | | |
| 9 | | 30 | | | | 70 | | | | |
| 10 | 50 | | | | | | | | 50 | |
| 11 | 40 | | | | | | | | | 60 |
| 12 | 30 | | | | | | 70 | | | |

Example 2

Pouches Containing Household Care Compositions

Single compartment pouches and/or multi-compartment pouches may be formed from any one of the films described in Example 1 (e.g., films including any of PVOH Blends 1-12). The pouches may contain household care compositions according to the following formulations. The perfume in each includes at least 2%, by weight of the perfume, of Quadrant I perfume raw materials. More particularly, as shown in Table 4, the perfume in Example A and Example B comprises from about 2% to about 10% of Q1 perfume raw materials, from about 5% to about 10% of Q2 perfume raw materials, from about 30 to about 40% of quadrant 3 raw materials and from about 50 to about 60% of quadrant 4 raw materials by weight of the total perfume.

TABLE 4

| Ingredient (wt %) | Example A | Example B |
| --- | --- | --- |
| Perfume | 2.0 (5% Q1 + 6% Q2 + 33% Q3 + 56% Q4) | 2.5 (7% Q1 + 7% Q2 + 35% Q3 + 51% Q4) |
| Organic Solvent system: | | |
| 1,2-propanediol | 9.0 | 12.5 |
| glycerol | 4.0 | 3.5 |
| dipropyleneglycol | 4.0 | 0 |
| Water | 9.0 | 9.0 |
| Monoethanolamine | 10.4 | 8.4 |
| Linear alkylbenzene sulphonic acid | 22.1 | 16.9 |
| C12-14EO3S anionic surfactant | 15.0 | 11.3 |
| C12-14EO7 nonionic surfactant | 3.9 | 13.7 |
| Top palm kernel fatty acid | 10.1 | 10.1 |
| Citric acid | 0.7 | 0.7 |
| Ethoxylated polyethyleneimine (PEI600EO20) | 3.3 | 3.5 |
| Amphiphilic graft copolymer comprising terephthalate | 2.6 | 2.6 |
| Hydroxyethyldiphosphonic acid | 2.3 | 2.5 |
| Brightener 49 | 0.4 | 0.4 |
| Hydrogenated Castor Oil | 0.1 | 0.1 |
| Mg Cl2 | 0.3 | 0.3 |
| Minors (dye, suds suppressor, enzyme, antioxidant, etc.) | Balance | Balance |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A container system comprising:
a closeable container having walls that define an interior space;
at least one pouch in the interior space, the pouch comprising a water-soluble film and a household care composition at least partially enclosed in a compartment by the water-soluble film,
the household care composition comprising from about 0.1% to about 10%, by weight of the household care composition, of perfume, and from about 1% to about 50%, by weight of the household care composition, of an organic solvent,
wherein the organic solvent is selected from the group consisting of glycerol, 1,2-propanediol, 1,3-propanediol, dipropylene glycol, diethylene glycol, polyalkylene glycol, sorbitol, and mixtures thereof;
the film comprising a polyvinyl alcohol (PVOH) resin blend,
the PVOH resin blend comprising a first PVOH polymer that comprises a first anionic monomeric unit, a vinyl alcohol monomer unit, and optionally a vinyl acetate unit,
wherein the first anionic monomeric unit is derived from a carboxylated anionic monomeric unit,
wherein the carboxylated monomeric unit is derived from a member selected from the group consisting of maleic acid, monoalkyl maleate, dialkyl maleate, maleic anyhydride, and combinations thereof,
wherein the first anionic monomeric unit is present in the film in an amount in a range of about 1 mol. % to about 5 mol. % of total PVOH polymers in the film, and
wherein the first PVOH polymer is present in the PVOH blend in a range of from about 20 wt. % to about 65 wt. %, by weight of the total PVOH polymers in the blend,
wherein the second PVOH polymer is present in the PVOH blend in a range of from about 30 wt % to about 80 wt. %, by weight of the total PVOH polymers in the blend, the PVOH resin blend further comprising a second PVOH polymer that is a PVOH homopolymer consisting essentially of a vinyl alcohol monomer unit and optionally a vinyl acetate unit.

2. A container system according to claim 1, wherein the first anionic monomer unit is derived from a monoalkyl maleate selected from the group consisting of monomethyl maleate, salts thereof, and combinations thereof.

3. A container system according to claim 1, wherein the first anionic monomer unit is present in the first PVOH polymer in an amount in a range of from about 2 mol. % to about 4 mol. % of the first PVOH polymer.

4. A container system according to claim 1,
wherein the first PVOH polymer is present in the PVOH blend in a range of from from about 20 wt. % to about 60 wt. %, by weight of the total PVOH polymers in the blend,
wherein the first anionic monomeric unit of the first PVOH polymer is derived from a member selected from the group consisting of monomethyl maleate, alkali metal salts thereof, and combinations thereof, and
wherein the PVOH homopolymer is characterized by a 4% solution viscosity at 20° C. ($\mu_2$) from about 10 cP to about 30 cP and is present in the PVOH resin blend in a range of from about 40 wt. % to about 80 wt. % by weight of the total PVOH polymers in the blend.

5. A container system according to claim 1, wherein the second PVOH polymer is characterized by a 4% solution viscosity at 20° C. ($\mu_2$) from about 3.0 to about 40 cP.

6. A container system according to claim 1, wherein the second PVOH polymer is characterized by a degree of hydrolysis of from about 60% to about 99%.

7. A container system according to claim 1, wherein the first PVOH polymer is characterized by a first 4% solution viscosity at 20° C. ($\mu_1$), wherein the second PVOH polymer is characterized by a second 4% solution viscosity at 20° C. ($\mu_2$), and wherein an absolute viscosity difference $|\mu_2-\mu_1|$ for the first PVOH polymer and the second PVOH polymer is in a range of 0 cP to about 10 cP.

8. A container system according to claim 1, wherein the PVOH resin blend is present in the water-soluble film in an amount in a range of about 30 wt. % to about 95 wt. %, by weight of the film.

9. A container system according to claim 1, wherein the water-soluble film has at least one, or at least two, or all three, of the following characteristics:
a) a residue value of about 48 wt. % or less as measured by the Dissolution Chamber Test;
b) an average tensile strength value of at least about 33 MPa as measured by the Tensile Strength Test; and/or
c) a modulus value of at least about 12 N/mm² as measured by the Modulus Test.

10. The container system of claim 1, wherein the water-soluble film further comprises one or more components selected from the group consisting of plasticizers, plasticizer compatibilizers, lubricants, release agents, fillers, extenders, cross-linking agents, antiblocking agents, antioxidants, detackifying agents, antifoams, nanoparticles, bleaching agents, surfactants, and combinations thereof.

11. The container system of claim 1, wherein the water-soluble film further comprises one or more plasticizers in an amount in a range of about 1 wt. % to about 40 wt. % of the film.

12. The container system of claim 1, wherein the pouch comprises at least two compartments, or at least three compartments.

13. A container system according to claim 1, wherein the perfume comprises from about 15% to about 60%, by weight of the perfume, of non-enduring perfume ingredients selected from Quadrant I perfume ingredients, Quadrant II perfume ingredients, Quadrant III perfume ingredients, and combinations thereof.

14. A container system according to claim 1, wherein the perfume comprises from about 2% to about 15%, by weight of the perfume, of Quadrant I perfume ingredients.

15. A container system according to claim 1, wherein the perfume comprises:
a) from about 2% to about 15%, preferably from about 3% to about 12%, more preferably from about 4% to about 10% by weight of the perfume accord of Quadrant I perfume ingredients;
b) from about 2.5% to about 25%, preferably from about 3% to about 20%, more preferably from about 5% to about 15% of Quadrant II perfume ingredients;
c) from about 10% to about 50%, preferably from about 15% to about 45%, more preferably from about 20% to about 40% of Quadrant III perfume ingredients; and
d) from about 40% to about 85%, preferably from about 45% to about 75%, more preferably from about 40% to about 65% of Quadrant IV perfume ingredients.

16. The container system of claim 1, wherein a portion of the perfume is encapsulated in a core-shell encapsulate.

17. The container system of claim 1, wherein the organic solvent comprises at least about 10%, or at least about 20%, by weight of the total organic solvent, of an organic solvent having a boiling point above 250° C., and wherein the perfume comprises at least about 10%, or at least about 20%, or at least about 30%, by weight of the total perfume, of perfume raw materials having a boiling point below 250° C.

18. The container system of claim 1, wherein the organic solvent comprises at least about 50%, or at least about 80%, or at least about 90%, or even at least about 95%, by weight of the total organic solvent, of an organic solvent having a cLogP value below zero, and wherein the perfume comprises at least about 50%, or at least about 80%, or at least about 90%, or even at least about 95%, by weight of the total perfume, of perfume raw materials having a having a cLogP value above zero.

19. The container system of claim 1, wherein the perfume comprises Quadrant I perfume ingredients.

20. The container system of claim 1, wherein the first anionic monomeric unit is derived from a monoalkyl maleate.

21. The container system of claim 1,
wherein the first PVOH polymer is present in the PVOH blend in a range of from about 30 wt. % to about 40 wt. %, by weight of the total PVOH polymers in the blend, and
wherein the second PVOH polymer is present in the PVOH blend in a range of from about 60 wt. % to about 70 wt. %, by weight of the total PVOH polymers in the blend.

\* \* \* \* \*